(12) United States Patent
Wang et al.

(10) Patent No.: US 11,124,898 B2
(45) Date of Patent: Sep. 21, 2021

(54) METHOD OF MAKING BICOMPONENT OR MULTICOMPONENT FIBERS

(71) Applicant: 4C Air, Inc., Sunnyvale, CA (US)

(72) Inventors: Qiqi Wang, Sunnyvale, CA (US); Lei Liao, Sunnyvale, CA (US); Yi Cui, Stanford, CA (US)

(73) Assignee: 4C Air, Inc., Sunnyvale, CA (US)

( * ) Notice: Subject to any disclaimer, the term of this patent is extended or adjusted under 35 U.S.C. 154(b) by 382 days.

(21) Appl. No.: 16/212,351

(22) Filed: Dec. 6, 2018

(65) Prior Publication Data

US 2019/0177879 A1 Jun. 13, 2019

Related U.S. Application Data

(60) Provisional application No. 62/596,057, filed on Dec. 7, 2017.

(51) Int. Cl.
| | |
|---|---|
| *D01D 5/32* | (2006.01) |
| *D01D 5/34* | (2006.01) |
| *D01D 5/00* | (2006.01) |
| *D01D 5/30* | (2006.01) |
| *B29C 48/18* | (2019.01) |
| *B29C 48/21* | (2019.01) |
| *D01D 1/02* | (2006.01) |
| *D01D 5/36* | (2006.01) |
| *B29L 9/00* | (2006.01) |

(52) U.S. Cl.
CPC .............. *D01D 5/34* (2013.01); *B29C 48/18* (2019.02); *B29C 48/21* (2019.02); *D01D 1/02* (2013.01); *D01D 5/0038* (2013.01); *D01D 5/0069* (2013.01); *D01D 5/30* (2013.01); *D01D 5/36* (2013.01); *B29L 2009/00* (2013.01); *D01D 5/0084* (2013.01)

(58) Field of Classification Search
CPC ..... B29C 48/18; B29C 48/21; B29L 2009/00; D01D 1/02; D01D 5/003; D01D 5/0038; D01D 5/0084; D01D 5/32; D01D 5/34; D01D 5/36
USPC ...... 264/103, 171.1, 172.11, 172.13, 172.14, 264/172.15, 465
See application file for complete search history.

(56) References Cited

U.S. PATENT DOCUMENTS

| | | | |
|---|---|---|---|
| 7,799,968 B2 | 9/2010 | Chen et al. | |
| 7,910,207 B2 | 3/2011 | Kamiyama et al. | |
| 8,034,400 B2 | 10/2011 | Rubahn et al. | |
| 2008/0105612 A1* | 5/2008 | Chappas ................ | D01D 5/34 210/502.1 |
| 2010/0166854 A1 | 7/2010 | Michniak-Kohn et al. | |
| 2011/0111012 A1* | 5/2011 | Pepper .............. | A61F 13/00995 424/445 |

(Continued)

FOREIGN PATENT DOCUMENTS

CN 106381532 A 2/2017

OTHER PUBLICATIONS

International Search Report and Written Opinion for International Application No. PCT/US2018/064298 dated Mar. 15, 2019. (13 pages).

*Primary Examiner* — Leo B Tentoni
(74) *Attorney, Agent, or Firm* — Sheppard Mullin Richter & Hampton LLP

(57) ABSTRACT

Disclosed herein are systems, devices, and method for forming bicomponent or multicomponent nanofibers.

8 Claims, 28 Drawing Sheets

(56) References Cited

U.S. PATENT DOCUMENTS

| | | | |
|---|---|---|---|
| 2013/0241115 A1* | 9/2013 | Sharma | D01D 5/0038 264/465 |
| 2015/0148496 A1* | 5/2015 | Jamiolkowski | A61B 17/064 525/411 |
| 2015/0174806 A1* | 6/2015 | Wong | D01D 5/0038 442/335 |
| 2017/0145602 A1 | 5/2017 | Dugan | |

* cited by examiner

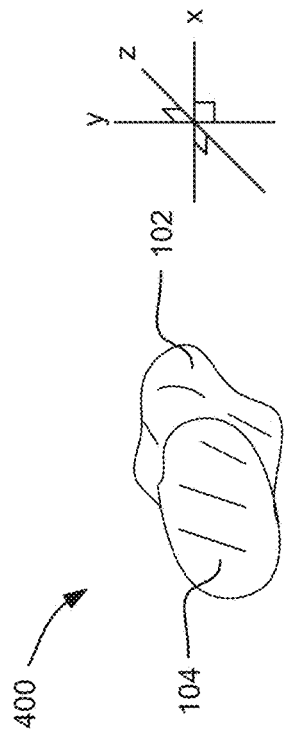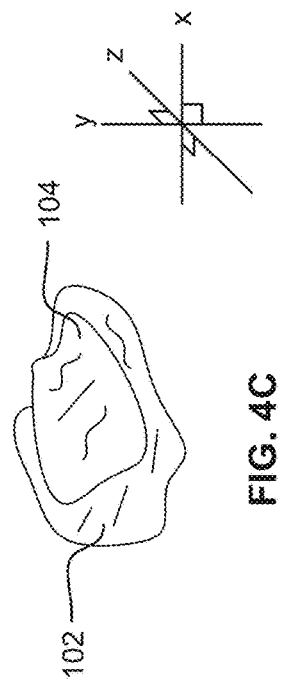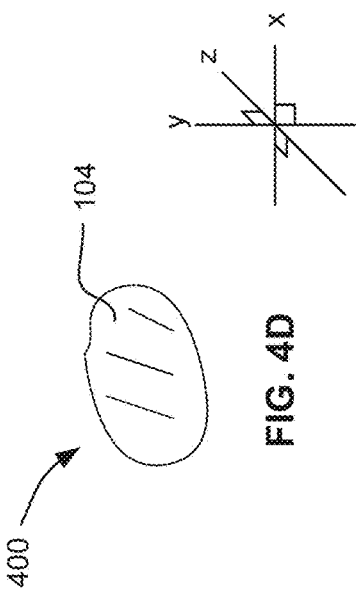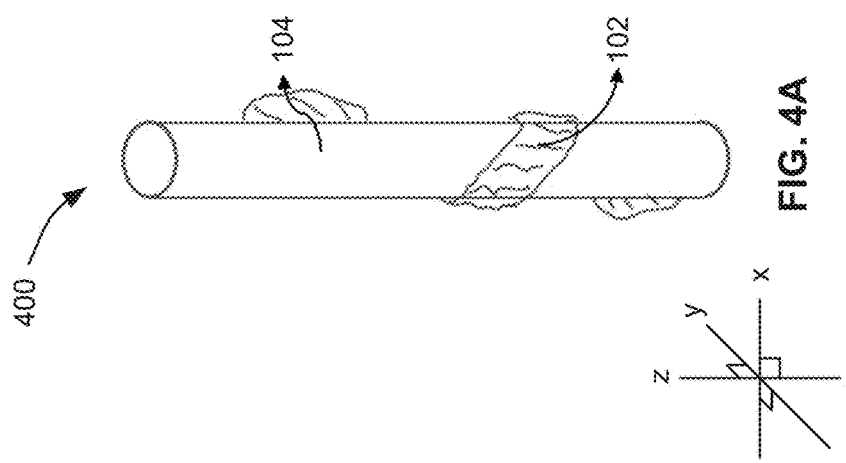

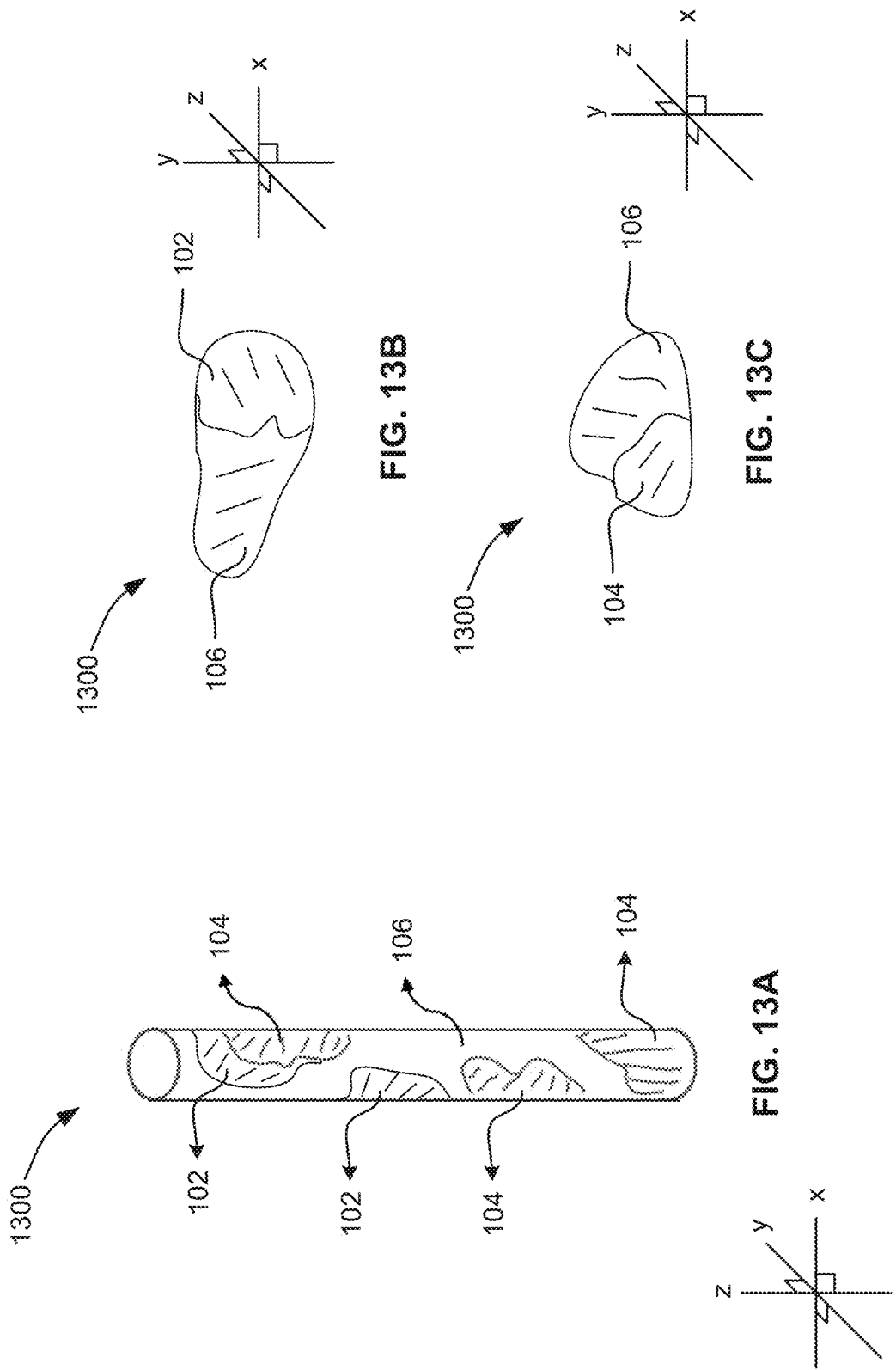

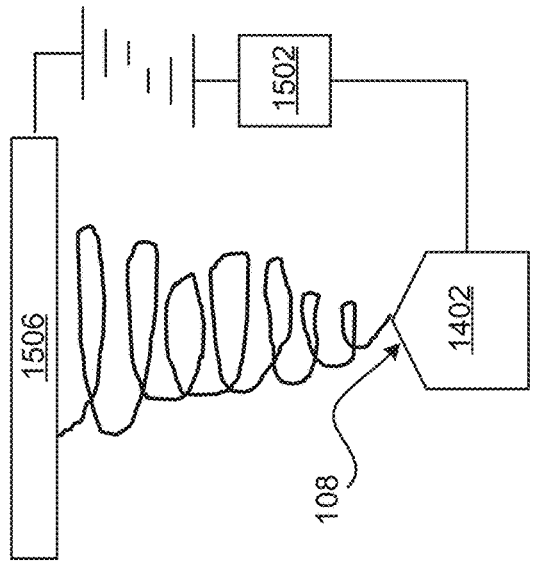
FIG. 15A
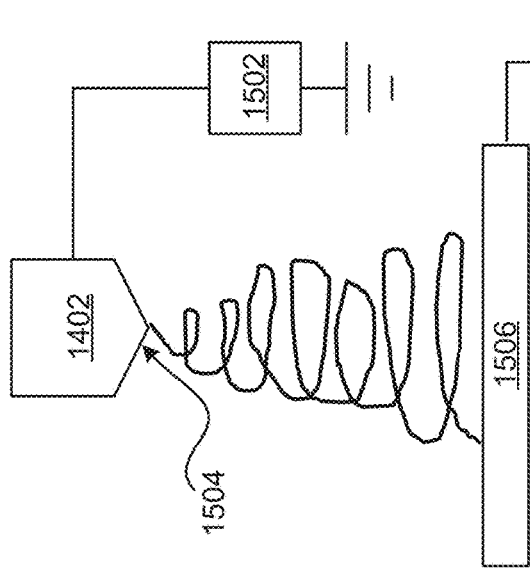
FIG. 15B
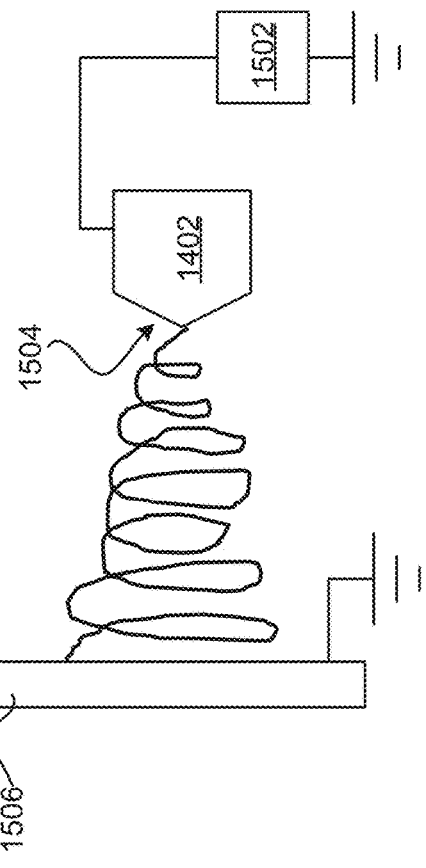
FIG. 15C
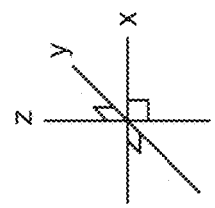

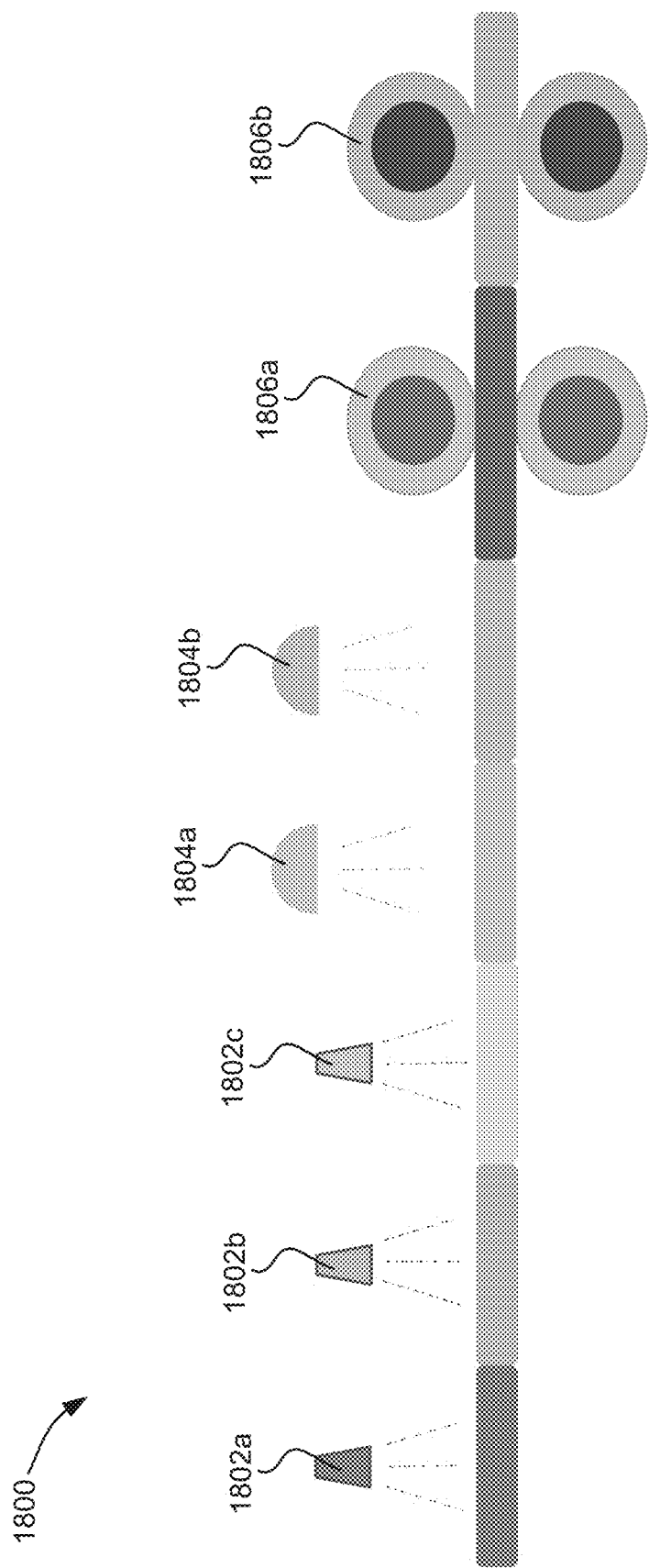

METHOD OF MAKING BICOMPONENT OR MULTICOMPONENT FIBERS

CROSS REFERENCE TO RELATED APPLICATIONS

This application claims the benefit under 35 U.S.C. § 119(e) of the U.S. Provisional Application Ser. No. 62/596,057 filed Dec. 7, 2017, the content of which is hereby incorporated by reference in its entirety.

BACKGROUND

Fibrous media, e.g., comprising polymer fibers, are used in a variety of diverse applications, such as medical and protective garments, insulation, filters, ceiling tiles, battery separator media, tissue engineering scaffolds, etc. There is a need in the art, however, for customizable and uniquely arranged bicomponent or multicomponent fibers that provide particular structural and/or functional benefits.

SUMMARY

The present disclosure provides unique bicomponent or multicomponent fibers, and customizable systems, devices, and methods for fabrication of the same.

Accordingly, in one embodiment, provided herein is a first method of preparing a bicomponent or multicomponent nanofiber with an electrospinning device that comprises a spinneret comprising a first channel and a second channel inside the first channel. The method, in some embodiments comprises: supplying a solution of a first polymer to a first channel; supplying a solution of a second polymer to the second channel; and electrospinning the solutions, through the respective channels, onto the surface of a substrate; thereby preparing a fibrous structure comprising fibers having a first layer and a second layer inside the first layer, wherein the first layer comprises the first polymer and the second layer comprises the second polymer.

In some embodiments of the first method, the first and second polymers disclosed herein have different dipole moments. In some embodiments, the first polymer has a dipole moment greater than about 2 D (Debye) and the second polymer has a dipole moment lower than about 1 D.

In some embodiments of the first method, the first channel and second channel of the spinneret are coaxial.

In some embodiments of the first method, said method further comprises supplying a solution of a third polymer to a third channel of the spinneret, wherein the third channel is inside the second channel, thereby resulting in prepared fibers comprising a first layer, a second layer inside the first layer, and a third layer inside the second layer. The first, second, and third layers may comprise the first, second and third polymers, respectively. In some embodiments, the third polymer has a dipole moment greater than the dipole moment of the second polymer. In some embodiments, the third polymer has a dipole moment greater than the second polymer, and less than the dipole moment of the first polymer. In some embodiment, the third polymer has a dipole moment greater than the dipole moment of the second polymer, and about equal to or greater than the dipole moment of the first polymer. In some embodiments, the first and third polymers are the same polymer. In some embodiments, the first and third polymers are different polymers. In some embodiments, the first polymer has a dipole moment greater than about 2 D. In some embodiments, the second polymer has a dipole moment lower than about 1 D. In some embodiments, the third polymer has a dipole moment about equal to or greater than about 1 D. In some embodiments, the first polymer has a dipole moment greater than about 2 D, the second polymer has a dipole moment lower than about 1 D, and the third polymer has a dipole moment equal to or greater than about 1 D.

In some embodiments of the first method, the spinneret comprises a plurality of non-overlapping second channels inside the first channel, and therefore the prepared fibers comprise a first layer and a plurality of non-overlapping second layers inside the first layer. In such embodiments, at least one of the second layers has a dipole moment lower than about 1 D.

In some embodiments of the first method, the spinneret comprises a plurality of non-overlapping second channels inside the first channel, and a third channel inside each of the plurality of second channels.

Also provided herein, in one embodiment, is a nanofiber comprising a first layer comprising a first polymer and a second layer inside the first layer and comprising a second polymer, wherein the first layer and the second layer have different dipole moments.

In some embodiments, the first layer of the nanofiber has a dipole moment greater than about 2 D and the second layer has a dipole moment lower than about 1 D.

In some embodiments, the nanofiber further comprise a third layer inside the second layer, wherein the second layer and the third layer have different dipole moments. In some embodiments, the first layer of the nanofiber has a dipole moment greater than about 2 D, and the second polymer has a dipole moment lower than about 1 D. In some embodiment, the first layer of the nanofiber has a dipole moment greater than about 2 D, the second polymer has a dipole moment lower than about 1 D, and the third layer has a dipole moment about equal to or greater than about 1 D.

In some embodiments, the nanofiber comprises a plurality of second layers. In such embodiments, at least one of the second layers of the nanofiber has a dipole moment lower than about 1 D. In some embodiments, the nanofiber further comprises a third layer inside each of the plurality of second layers, and wherein each third layer has a different dipole moment from the respective second layer.

Also provided herein, in one embodiment, is a second method of preparing a bicomponent or multicomponent nanofiber, wherein the method comprises: admixing a first polymer solution with a second polymer solution under suitable conditions to prepare a mixture; and electrospinning the mixture onto the surface of a substrate under conditions to allow the first polymer solution and the second polymer solution to maintain or separate into different phases, thereby preparing a fibrous structure comprising fibers having the first polymer and the second polymer in separate portions.

In some embodiments of the second method, the first polymer and the second polymer have different dipole moments. In some embodiments, the first polymer has a dipole moment greater than about 2 D and the second polymer has a dipole moment lower than about 1 D In some embodiments of the second method, the mixture comprises about equal volumes of the first polymer solution and the second polymer solution. In some embodiments, the ratio of the first polymer solution to the second polymer solution in the mixture is about 100:1 to about 1:100. In some embodiments, the ratio of the first polymer solution to the second polymer solution in the mixture is about 1:100 to about 1:1, about 1:75 to about 1:1, about 1:50 to about 1:1, about 1:25 to about 1:1, about 1:10 to about 1:1, about 1:5 to about 1:1, or about 1:1. In some embodiments, the ratio of the first polymer solution to the second polymer solution in the mixture is about 100:1 to about 1:1, about 75:1 to about 1:1, about 50:1 to about 1:1, about 25:1 to about 1:1, about 10:1 to about 1:1, about 5:1 to about 1:1, or about 1:1. In some embodiments, the ratio of the first polymer solution to the second polymer solution in the mixture is about 1:1.

In some embodiments of the second method, at least part of the first polymer solution is phase separated from the second polymer solution. In some embodiments of the second method, at least a portion of the mixture is non-homogenous, and the at least part of the first polymer solution is phase separated from the second polymer solution during the electrospinning.

In some embodiments of the second method, the first polymer solution is substantially evenly dispersed in the second polymer solution.

In some embodiments of the second method, the first polymer solution comprises a first therapeutic molecule. In some embodiments, the second polymer solution comprises a second therapeutic molecule. In some embodiments, the first therapeutic molecule requires a shorter release time in human patients than the second therapeutic molecule. In some embodiments, the second therapeutic molecule requires a shorter release time in human patients than the first therapeutic molecule.

Also provided herein, in one embodiment, is a third method of preparing a fibrous structure with an electrospinning device comprising a plurality of spinnerets, wherein the method comprises: supplying a solution of a first polymer to at least one of the spinnerets; supplying a solution of a second polymer to at least another of the spinnerets; and electrospinning the solutions, through the respective spinnerets, onto the surface of a substrate, thereby preparing a fibrous structure comprising fibers having different polymers.

In some embodiments of the third method, the first polymer and the second polymer have different dipole moments. In some embodiments, the first polymer has a dipole moment greater than about 2 D and the second polymer has a dipole moment lower than about 1 D In some embodiments of the third method, the electrospinning device comprises at least a row of spinnerets, where at least one of the spinnerets in the row is connected to the first solution and at least another of the spinnerets in the row is connected to the second solution. In some embodiments, the electrospinning device comprises a plurality of rows of spinnerets, where all spinnerets in at least one row are connected to the first solution and all spinnerets in at least another row are connected to the second solution.

Also provided herein, in one embodiment, is a fourth method of preparing a bicomponent or multicomponent nanofiber, wherein the method comprises: dipping a particle in a mixture of a first polymer solution and a second polymer solution; lifting the particle out of the mixture under conditions to allow the particle to be covered with the mixture; and applying an electrical field between the particle and a collector to force a nanofiber to form from the mixture on the particle and be collected on the collector, wherein the nanofiber comprises both the first polymer and the second polymer.

In some embodiments of the fourth method, at least part of the first solution has phase separation from the second solution. In some embodiments, at least part of the first polymer solution is substantially located at the surface of the mixture.

In some embodiments of the fourth method, the particle has an exterior rough surface. In some embodiments, the particle has a smooth exterior surface. In some embodiments, the particle is connected to one or more particles through a thread.

In some embodiments of the first, second, third, and fourth methods disclosed above, said methods may further comprises adding one or more additives by electrospinning, electrospraying, a spraying process, a rolling process, etc.

Also provided herein, in one embodiment, is a fifth method of preparing a bicomponent or multifunctional nanofiber web, wherein the method comprises: forming a first layer of a nanofiber web on a substrate by electrospinning system; and adding a functional layer on the first layer with a second electrospinning system, spray system, or rolling system.

In some embodiments of the fifth method, the first layer comprises at least two polymers having different dipole moments. In some embodiments, one of the polymers has a dipole moment greater than about 2 D and another of the polymers has a dipole moment lower than about 1 D.

In some embodiments of the fifth method, the resulting multicomponent nanofiber web is configured to be useful for light emission, heat insulation, heat resistance, sterilization, flame resistance, degradation, self-cleaning, anti-corrosion, or combinations thereof.

BRIEF DESCRIPTION OF THE FIGURES

Exemplary and non-limiting embodiments of the inventions may be more readily understood by referring to the accompanying drawings, in which:

FIG. 4A is a side view of a bicomponent, partially coated nanofiber, according to one embodiment. FIGS. 4B-4D are three cross-sectional views of the bicomponent, partially coated nanofiber of FIG. 4A taken at three different cross-sections thereof.

FIG. 13A is a side view of a multicomponent, aggregate nanofiber, according to one embodiment. FIGS. 13B-13E are four cross-sectional views of the multicomponent, aggregate nanofiber of FIG. 13A taken at four different cross-sections thereof.

FIGS. 14A-14B are cross-sectional and a top-down views, respectively, of an embodiment in which the system comprises at least one spinneret configured to form bicomponent, coaxial ("sheath-core") nanofiber fibers. FIGS. 14C-14D are cross-sectional and a top-down views, respectively, of another embodiment in which the system comprises at least one spinneret configured to form bicomponent, islands-in-sea nanofibers. FIGS. 14E-14F are cross-sectional and top-down views, respectively, of an embodiment in which the system comprises at least one spinneret configured to form multicomponent, coaxial ("sheath") nanofibers. FIGS. 14G-14H are cross-sectional and top-down views of an embodiment in which the system comprises at least one spinneret configured to form a first type of multicomponent, islands-in-sea nanofibers. FIGS. 14I-14J are cross-sectional and top-down views of an embodiment in which the system comprises at least one spinneret configured to form a second type of multicomponent, islands-in-sea nanofiber. FIG. 14K is a cross-sectional view of an embodiment in which the system comprises at least one spinneret configured to form bicomponent or multicomponent fully coated, partially coated, dispersed, or aggregate nanofibers.

FIGS. 15A-15C are simplified schematics of a top-down electrospinning process (FIG. 15A), a bottom-up electrospinning process (FIG. 15B), and a vertical electrospinning process (FIG. 15C), according to various embodiments.

FIG. 18 is a simplified schematic of a system for producing multifunctional nanofiber webs, according to one embodiment.

DETAILED DESCRIPTION

Figure 1:
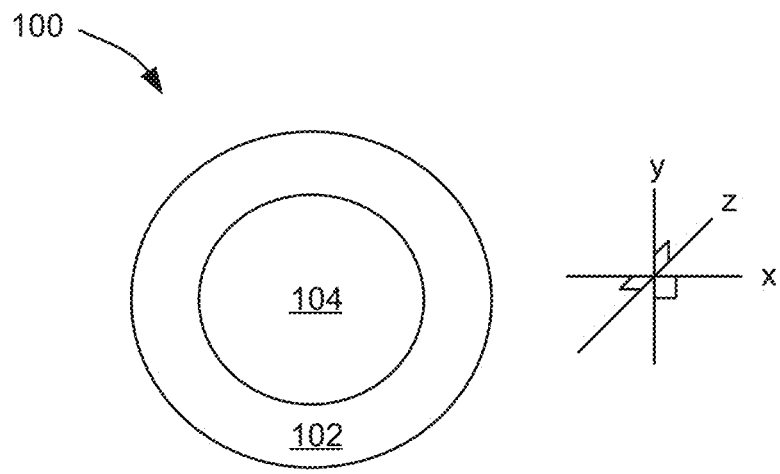
FIG. 1 is a cross-sectional view of a bicomponent nanofiber comprising a coaxial (sheath-core) structure, according to one embodiment.

Described herein are systems, devices, and methods for producing bicomponent or multicomponent fibers.
1. Nanofibers Provided herein, in some embodiments, is a nanofiber comprising at least two polymers having different compositions and/or different characteristics/properties from one another. For instance, in some embodiments, the at least two polymers may have different dipole moments. In some embodiment, the difference between the dipole moments of the at least two polymers may be at least about 1.0 D. In some embodiments, the difference between the dipole moments of the at least two polymers may be at least about 1.0 D, at least about 1.5 D, at least about 2.0 D, at least about 2.5 D, at least about 3.0 D, at least about 3.5 D, at least about 4.0 D, at least about 4.5 D, at least about 5.0 D, at least about 5.5 D, at least about 6.0 D, at least about 6.5 D, at least about 7.0 D, at least about 7.5 D, at least about 8.0 D, at least about 8.5 D, at least about 9.0 D, at least about 9.5 D, or at least about 10.0 D. In some embodiments, the difference between the dipole moments of the at least polymers may range from about 1.0 D to about 10.0 D.

In some embodiments, at least a first of the polymers may have a dipole moment about equal to or greater than about 2.0 D. In some embodiments, this first polymer may have a dipole moment equal to or greater than about 2.0 D, about 2.2 D, about 2.4 D, about 2.6 D, about 2.8 D, about 3.0 D, about 3.2 D, about 3.4 D, about 3.6 D, about 3.8 D, about 4.0 D, about 4.2 D, about 4.4 D, about 4.6 D, about 4.8 D, about 5.0 D, about 5.2 D, about 5.4 D, about 5.6 D, about 5.8 D, about 6.0 D, about 6.2 D, about 6.4 D, about 6.6 D, about 6.8 D, about 7.0 D, about 7.2 D, about 7.4 D, about 7.6 D, about 7.8 D, about 8.0 D, about 8.2 D, about 8.4 D, about 8.6 D, about 8.8 D, about 9.0 D, about 9.2 D, about 9.4 D, about 9.6 D, about 9.8 D, or about 10.0 D. In some embodiments, this first polymer may have a dipole moment ranging from about 2.0 D to about 10.0 D.

Exemplary materials for the first polymer may include, but are not limited to, polyimide, polyvinylidene fluoride, polyacrylonitrile, polyvinylpyrrolidone, and combinations thereof. In some embodiments, the first polymer may comprise polyimide having a dipole moment of about 6.1 D. In some embodiments, the first polymer may comprise polyvinylpyrrolidone having a dipole moment of about 2.3 D. In some embodiments, the first polymer may comprise polyvinylidene fluoride having a dipole moment of about 2.0 D. In some embodiment, the first polymer may comprise polyacrylonitrile having a dipole moment of about 2.0 D. In some embodiment the first polymer may comprise any combination (e.g., at least two, at least three, or each) of polyimide, polyvinylidene fluoride, polyacrylonitrile, and polyvinylpyrrolidone.

In some embodiments, at least a second of the polymers may have a dipole moment equal to or less than about 1.0 D.

In some embodiments, the second polymer may have a dipole moment equal to or less than about 1.0 D, about 0.9 D, about 0.8 D, about 0.7 D, about 0.6 D, about 0.5 D, about 0.4 D, about 0.3 D, about 0.2 D, about 0.1 D, about 0.5 D, or about 0.0 D. In some embodiments, the second polymer may have a dipole moment ranging from about 1.0 D to 0.0 D.

Exemplary materials for the second polymer may include, but are not limited to, polypropylene, polyethylene, polystyrene, polytetrafluorethylene, or combinations thereof. In some embodiments, the second polymer may comprise polystyrene having a dipole moment of about 0.7 D. In some embodiments, the second polymer may comprise polypropylene having a dipole moment of about 0.6 D. In some embodiments, the second polymer may comprise polyethylene having a dipole moment of about 0.0 D. In some embodiments, the second polymer may comprise polytetrafluorethylene having a dipole moment of about 0.0 D. In some embodiments, the second polymer may comprise any combination (e.g., at least two, at least three, or each) of polypropylene, polyethylene, polystyrene, and polytetrafluorethylene.

In some embodiments, the nanofiber may comprise at least a first polymer having a high dipole moment, and at least a second polymer having a low dipole moment. By way of example, the first polymer may have a dipole moment equal to or greater than about 2.0 D, and the second polymer may have a dipole moment less than about 1.0 D. The combination of the first polymer having a high dipole moment and the second polymer having a low dipole moment may result in a nanofiber having unique structural characteristics, properties, and/or functionalities. For instance, the first polymer having a high dipole moment may be hydrophilic, may have high surface energy, and/or be capable of retaining particulate matter. The second polymer having a low dipole moment may be hydrophilic, may have a low surface energy, and/or may be capable of grabbing particulate matter. Accordingly, in embodiments in which the nanofiber comprises at least the first and second polymers having a high or low dipole moment, respectively, the nanofiber may exhibit superior mechanical properties, controlled hydrophobicity and/or hydrophilicity, controlled surface energy, and/or a controlled capacity to retain and/or grab particulate matter. In some embodiments, the composition and/or arrangement of the polymers in the nanofiber may be tailored/selected so as to produce a desired characteristic or functionality such as with respect to the degree of hydrophobicity or hydrophilicity, surface energy, ability to retain and/or grab particulate matter, and/or the structural integrity of the nanofiber. Moreover, such nanofibers comprising at least the first and second polymers having a high or low dipole moment, respectively, may be uniquely suited for a variety of applications, including, but not limited to, applications in the printing industry, air filtration, oil separation, catalytic systems, etc.

In some embodiments, the nanofiber may be a bicomponent nanofiber comprising two polymers with different dipole moments from one another. In some embodiments, the nanofiber may be a multicomponent nanofiber comprising three or more polymers, where at least two of the polymers have different dipole moments from one another. In some embodiment, the bicomponent or multicomponent nanofiber may have a coaxial (sheath-core) structure, an "islands-in-sea" type structure, an aggregated structure, a dispersed structure, a partially coated structure, or a fully coated structure, as discussed in greater detail below.

It is of note that in some embodiments, the nanofiber may comprise at least two polymers that differ with respect to properties other than, or in addition to, the respective dipole moments. For instance, in some embodiments, the at least two polymers may differ with respect to the degree of adhesiveness of the polymers. For instance, in some embodiments, a first of the polymers may comprise an adhesive material, and the second of the polymers may comprise a non-adhesive material or a material that is less-adhesive than that of the first polymer.

Exemplary adhesive materials may include, but are not limited to, a pressure sensitive adhesive polymer, a light sensitive adhesive polymer, a hot-melt adhesive polymer, or combinations thereof. Additional examples of adhesive materials include, but are not limited to, ethylene-vinyl acetate (EVA), polyolefins (PO), polyamides (PA), polyester, polyurethane (PU), an acrylic, bio-based acrylate, butyl rubber, nitriles, silicone rubber, styrene butadiene rubber, natural rubber latex, and combinations thereof.

Exemplary non-adhesive polymer materials may include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly(ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), polyphenylene terephthalamide, polytetrafluoroethylene, or combinations thereof.

a. Bicomponent Fibers

FIGS. 1-6D show various views of bicomponent nanofibers comprising a first layer 102 and a second layer 104 arranged in different relative configurations, according to various embodiments. The nanofibers, or features thereof, in FIGS. 1-6D may be implemented in combination with, or as an alternative to, other nanofibers, or features thereof, described herein, such as those described with reference to other embodiments and FIGS. The nanofibers of FIGS. 1-6D may additionally be utilized in any of the methods for making and/or using nanofibers described herein. The nanofibers of FIGS. 1-6D may also be used in various applications and/or in permutations, which may or may not be noted in the illustrative embodiments described herein. For instance, the nanofibers of FIGS. 1-6 may include more or less features/components than those shown in FIGS. 1-6D, in some embodiments. Moreover, the nanofibers of FIGS. 1-6D are also not limited to the size, shape, number of components/features, etc. specifically shown in FIGS. 1-6D. Further, as the nanofibers of FIGS. 1-6D may be variations of one another, like features or components are assigned the same reference number.

In some embodiments, the first layer 102 of the bicomponent nanofibers may comprise a first polymer, as disclosed herein, and the second layer 104 of the bicomponent nanofibers may comprise a second polymer, as disclosed herein. In some embodiments, the first polymer and the second polymer may have different dipole moments. For instance, in some embodiments, the first layer 102 may comprise a first polymer having a high dipole moment (e.g., equal to or greater than about 2.0 D), and the second layer 104 may comprise a second polymer having a low dipole moment (e.g., less than about 1.0 D), as disclosed herein.

In some embodiments, the first and second polymers may differ with respect to the degree of adhesiveness of the polymers. For instance, in some embodiments, the first polymer may comprise an adhesive material, and the second polymer may comprise a non-adhesive material or a material that is less-adhesive than that of the first polymer.

Exemplary adhesive materials may include, but are not limited to, a pressure sensitive adhesive polymer, a light sensitive adhesive polymer, a hot-melt adhesive polymer, or combinations thereof. Additional examples of adhesive materials include, but are not limited to, ethylene-vinyl acetate (EVA), polyolefins (PO), polyamides (PA), polyester, polyurethane (PU), an acrylic, bio-based acrylate, butyl rubber, nitriles, silicone rubber, styrene butadiene rubber, natural rubber latex, and combinations thereof.

Exemplary non-adhesive polymer materials may include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly(ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), polyphenylene terephthalamide, polytetrafluoroethylene, or combinations thereof.

It is of note that the first polymer and the second polymer, as disclosed herein, need not be limited to the first layer 102 and the second layer 104, respectively. As such, in some embodiments, the first layer 102 may comprise the second polymer, and the second layer 104 may comprise the first polymer.

Referring now to FIG. 1, a cross-sectional view of a bicomponent nanofiber 100 comprising a coaxial (sheath-core) structure is shown according to one embodiment, where the cross-section is taken perpendicular to the longitudinal axis of the bicomponent nanofiber 100. As shown in FIG. 1, the bicomponent, coaxial nanofiber 100 comprises a first layer 102 and a second layer 104 disposed within/inside the first layer 102. Stated another way, the bicomponent, coaxial nanofiber 100 comprises a first layer 102 substantially surrounding/encircling the second layer 104.

In some embodiments, the first layer 102 of the bicomponent, coaxial nanofiber 100 may comprise the first polymer, as disclosed herein, and the second layer 104 may comprise the second polymer, as disclosed herein. In some embodiment, however, the first layer 102 of the bicomponent, coaxial nanofiber 100 may comprise the second polymer, and the second layer 104 may comprise the first polymer.

Figure 2:
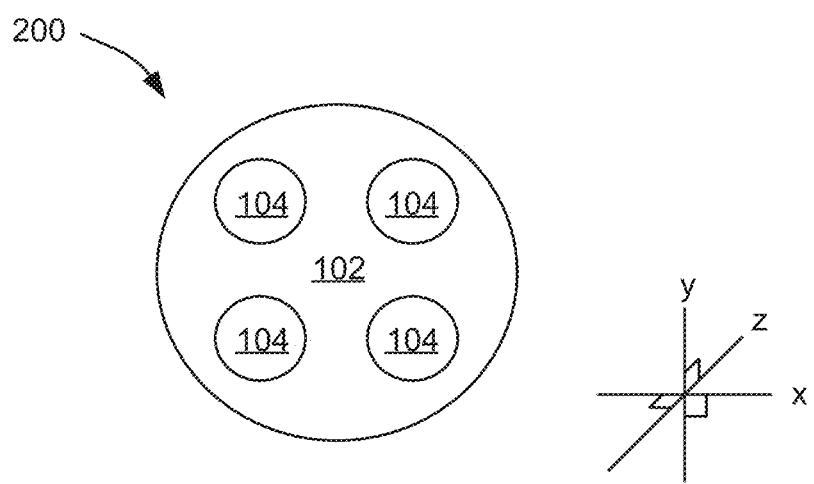
FIG. 2 is a cross-sectional view of a bicomponent nanofiber comprising an "islands-in-sea" structure, according to one embodiment.

Referring now to FIG. 2, a cross-sectional view of a bicomponent nanofiber 200 comprising an "islands-in-sea" structure is shown according to one embodiment, where the cross-section is taken perpendicular to the longitudinal axis of the nanofiber 200. In some embodiments, the bicomponent, islands-in-sea nanofiber 200 comprises the first layer 102, and two or more "islands" comprising the second layer 104 and which are disposed within/inside the "sea" of the first layer 102. In the exemplary embodiment of FIG. 2, the bicomponent, islands-in-sea nanofiber 200 may comprise the first layer 102 substantially surrounding/encircling four separate islands comprising the second layer 104. In some embodiments, however, the number of "islands" comprising the second layer 104 may be any integer number equal to or greater than 2 (e.g., 3, 4, 5, 6, 7, 8, etc.).

In some embodiments, the first layer 102 of the bicomponent, islands-in-sea nanofiber 200 may comprise the first polymer, as disclosed herein, and the second layer 104 may comprise the second polymer, as disclosed herein. However, in alternative embodiments, the first layer 102 of the bicomponent, islands-in-sea nanofiber 200 may comprise the second polymer, and the second layer 104 may comprise the first polymer.

Figure 3B:
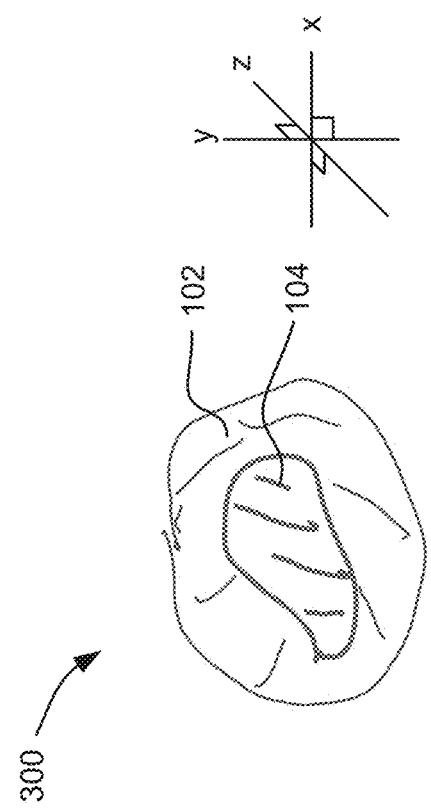
FIGS. 3B-3C are two cross-sectional views of the bicomponent, fully coated nanofiber of FIG. 3A taken at two different cross-sections thereof.
Figure 3C:
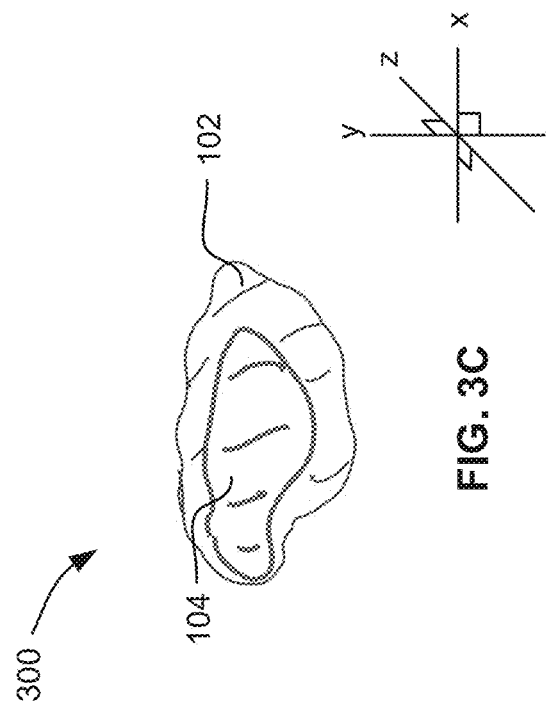
Figure 3A:
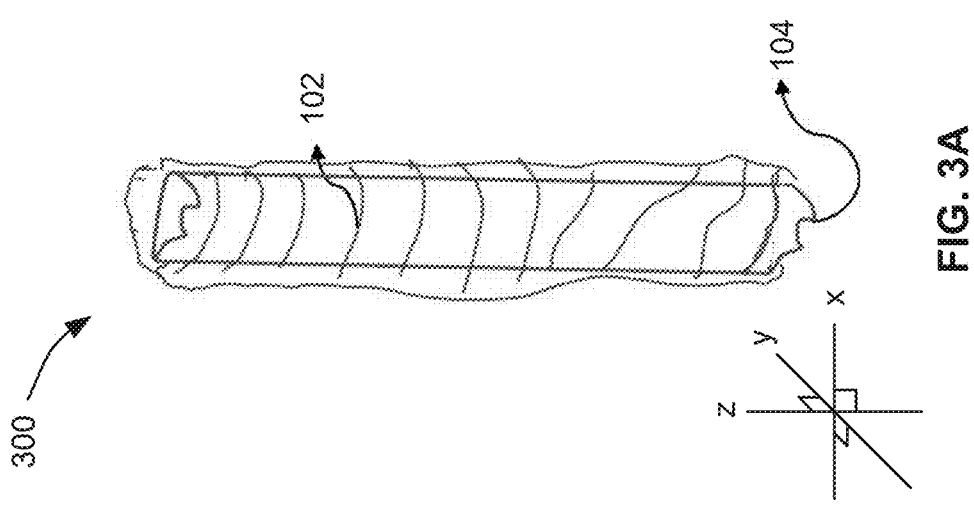
FIG. 3A is a side view of a bicomponent, fully coated nanofiber, according to one embodiment.

Referring now to FIG. 3A, a side view of a bicomponent, fully coated nanofiber 300 is shown according to one embodiment. As shown in FIG. 3A, the bicomponent, fully coated nanofiber 300 comprises the first layer 102 substantially coating the second layer 104. The bicomponent, fully coated nanofiber 300 is a similar to the bicomponent, coaxial nanofiber 100 shown in FIG. 1, except that the bicomponent, fully coated nanofiber 300 does not have a substantially uniform cross-section. For instance, while the second layer 104 is disposed within the first layer 102 along the length of the bicomponent, fully coated nanofiber 300, the shape and amount of the first layer 102 surrounding/encircling the second layer 104 at one or more of the cross-sections of said nanofiber 300 may be different.

By way of example, FIGS. 3B-3C provide two cross-sectional views of the bicomponent, fully coated nanofiber 300 taken at two different cross-sections thereof. As evident in FIGS. 3B-3C, the cross-sectional shape of the combination of the first and second layers 102, 104 vary at these two different cross-sections of the nanofiber 300. In some embodiments, the cross-sectional shape of the combination of the first and second layers 102, 104 may vary at each cross-section of the nanofiber 300.

In some embodiments, the first layer 102 of the bicomponent, fully coated nanofiber 300 may comprise the first polymer, as disclosed herein, and the second layer 104 may comprise the second polymer, as disclosed herein. However, in alternative embodiments, the first layer 102 of the bicomponent, fully coated nanofiber 300 may comprise the second polymer, and the second layer 104 may comprise the first polymer.

As discussed previously, the first polymer may have a high dipole moment, and the second polymer may have a low dipole moment, in some embodiments. By way of example, the first polymer may have a dipole moment equal to or greater than about 2.0 D, and the second polymer may have a dipole moment less than about 1.0 D. As such, the first, high dipole moment polymer may have a high surface energy and/or be capable of retaining particulate matter. The second, low dipole moment polymer, may have a low surface energy and/or be capable of grabbing particulate matter. Accordingly, for the bicomponent nanofibers 100 (coaxial), 200 (islands-in-sea), 300 (fully coated) in which the first, high dipole moment polymer is present in the first layer 102 (the external layer), and the second, low dipole moment is present in the second layer(s) 104 (the internal layer(s)), the resulting nanofibers can simultaneously grab and retain particulate matter, which may be particularly useful for filtration applications.

Referring now to FIG. 4A, a side view of a bicomponent, partially coated nanofiber 400 is shown according to one embodiment. As shown in FIG. 4A, the bicomponent, partially coated nanofiber 400 comprises the first layer 102 as a coating on one or more portions of the second layer 104. In contrast to the bicomponent, fully coated nanofiber 300 of FIGS. 3A-3C, the first layer 102 of the bicomponent, partially coated nanofiber 400 does not coat (e.g. surround/encircle) all portions of the second layer 104.

However, similar to the bicomponent, fully coated nanofiber 300 of FIGS. 3A-3C, the bicomponent, partially coated nanofiber 400 does not have a uniform cross-section. For instance, one or more cross-sections of the bicomponent, partially coated nanofiber 400 may differ with respect to the shape and amount of the first layer 102 surrounding/encircling the innermost second layer 104, as shown, e.g., in the two cross-sectional views provided in FIGS. 4B-4C. As also shown in FIG. 4D, there may be one or more regions of the bicomponent, partially coated nanofiber 400 that include solely the second layer 104 with no coating of the first layer 102 thereon.

In some embodiments, the first layer 102 of the bicomponent, partially coated nanofiber 400 may comprise the first polymer, as disclosed herein, and the second layer 104 may comprise the second polymer, as disclosed herein. However, in alternative embodiments, the first layer 102 of the bicomponent, partially coated nanofiber 400 may comprise the second polymer, and the second layer 104 may comprise the first polymer.

Figure 5:
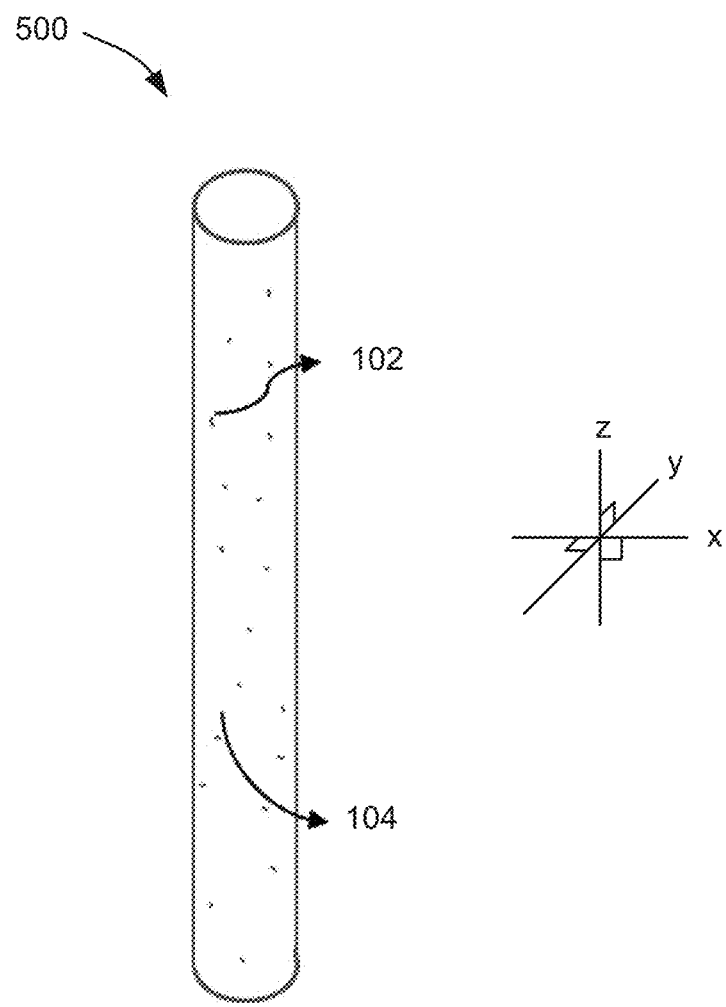
FIG. 5 is a side view of a bicomponent, dispersed nanofiber, according to one embodiment.

Referring now to FIG. 5, a side view of a bicomponent, dispersed nanofiber 500 is shown according to one embodiment. As shown in FIG. 5, the bicomponent, dispersed nanofiber 500 comprises a dispersion of the first layer 102 and the second layer 104. In some embodiments, the bicomponent, dispersed nanofiber 500 may comprise a uniform dispersion of the first layer 102 and the second layer 104.

In the embodiment of FIG. 5, the first layer 102 may be dispersed within/throughout the second layer 102. In such embodiments, the ratio of the second layer 104 to the first layer 102 is about 100:1 to about 1:1. In some embodiments, the ratio of the second layer 104 to the first layer 102 is about 100:1 to about 1:1, about 75:1 to about 1:1, about 50:1 to about 1:1, about 25:1 to about 1:1, about 10:1 to about 1:1, about 5:1 to about 1:1, or about 1:1. In some embodiments, the ratio of the second layer 104 to the first layer 102 is about 20:1 to about 5:1.

In some embodiments, the first layer 102 of the bicomponent, dispersed nanofiber 500 may comprise the first polymer, as disclosed herein, and the second layer 104 may comprise the second polymer, as disclosed herein. However, in alternative embodiments, the first layer 102 of the bicomponent, dispersed nanofiber 500 may comprise the second polymer, and the second layer 104 may comprise the first polymer.

Figure 6B:
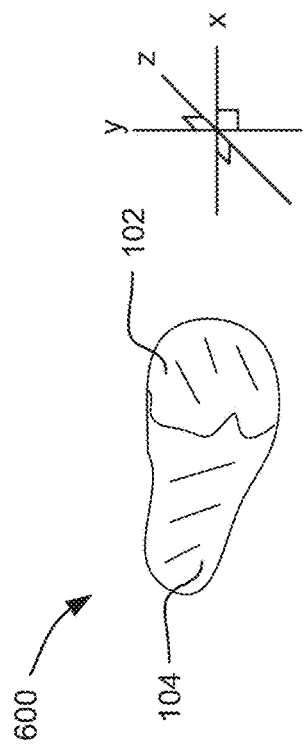
FIGS. 6B-6D are three cross-sectional views of the bicomponent, aggregate nanofiber of FIG. 6A taken at three different cross-sections thereof.
Figure 6C:
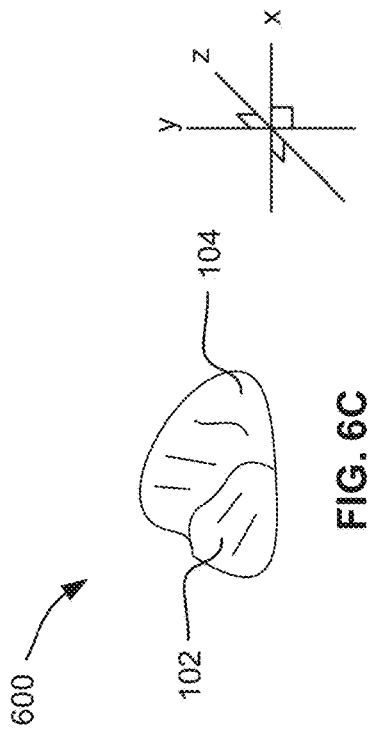
Figure 6D:
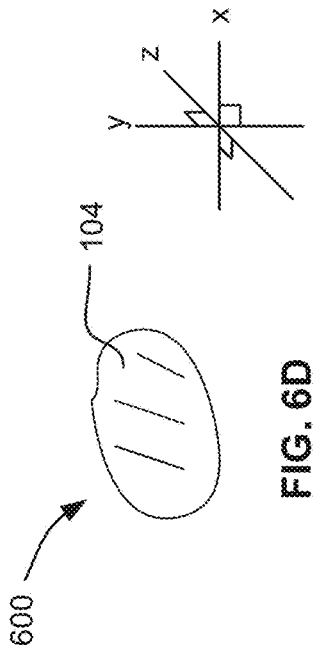
Figure 6A:
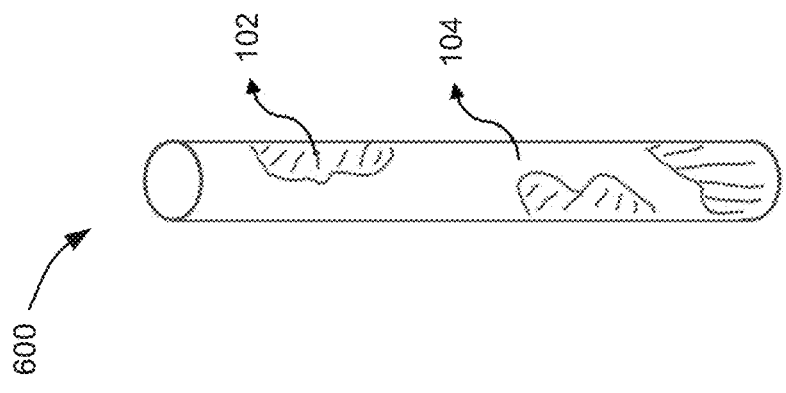
FIG. 6A is a side view of a bicomponent, aggregate nanofiber, according to one embodiment.

Referring now to FIG. 6A, a side view of a bicomponent, aggregate nanofiber 600 is shown according to one embodiment. As shown in FIG. 6A, the bicomponent, aggregate nanofiber 600 comprises the first layer 102 dispersed within one or more portions of the second layer 104. In contrast to the bicomponent, dispersed nanofiber 500 of FIG. 5, the first layer 102 of the bicomponent, aggregate nanofiber 600 is dispersed only within certain portions, and not throughout substantially the entirety, of the second layer 104.

The bicomponent, aggregate nanofiber 600 may not have a uniform cross-section. For instance, one or more cross-sections of the bicomponent, aggregate nanofiber 600 may differ with respect to the shape and amount of the first layer 102 dispersed within the second layer 104, as shown, e.g., in the two cross-sectional views provided in FIGS. 6B-6C. As also shown in FIG. 6D, there may be one or more regions of the bicomponent, aggregate nanofiber 600 that include solely the second layer 104 with none of the first layer 102 dispersed within.

In alternative embodiments, the second layer 104 of the bicomponent, aggregate nanofiber 600 may be dispersed within one or more portions, but not the throughout the entirety, of the first layer 102.

In some embodiments, the first layer 102 of the bicomponent, aggregate nanofiber 600 may comprise the first polymer, as disclosed herein, and the second layer 104 may comprise the second polymer. However, in alternative embodiments, the first layer 102 of the bicomponent, aggregate nanofiber 600 may comprise the second polymer, and the second layer 104 may comprise the first polymer.

As discussed previously, the first polymer may have a high dipole moment (e.g., equal to or greater than about 2.0 D) and be hydrophilic, whereas the second polymer may have a low dipole moment (e.g., less than about 1.0 D) and be hydrophobic. In such embodiments, the bicomponent nanofibers 400 (partially coated), 500 (dispersed), 600 (aggregate) may be used as a drug carrier or other carriers for fine chemistry, where the first, hydrophilic polymer with the high dipole moment will release a drug or chemicals quickly in an aqueous process, and the second, hydrophobic polymer with the low dipole moment will release the drug or chemicals slowly in an aqueous process. Accordingly, said bicomponent nanofibers 400, 500, 600 coupled to at least two drugs or chemicals can successively release the at least two drugs or chemicals in an aqueous process.

In some embodiments, the first, hydrophilic polymer and the second, hydrophobic polymer may be coupled to different drugs (therapeutic molecules) or chemicals. For instance, in one exemplary embodiment, the first, hydrophilic polymer may be coupled to a first therapeutic molecule and the second, hydrophobic polymer may be coupled to a second therapeutic molecule, where the first therapeutic molecule may require a shorter release time in human patients as compared to the second therapeutic molecule. In some embodiments, the first, hydrophilic polymer and the second, hydrophobic polymer may be coupled to different drugs or chemicals. For instance, in one exemplary embodiment, the first, hydrophilic polymer may be coupled to a first therapeutic molecule and the second, hydrophobic polymer may be coupled to a second therapeutic molecule, where the second therapeutic molecule may require a shorter release time in human patients as compared to the first therapeutic molecule.

b. Multicomponent Nanofibers

FIGS. 7-13E show various views of multicomponent nanofibers comprising at least a first layer 102, at least a second layer 104, and at least third layer 106 arranged in different relative configurations, according to various embodiments. The nanofibers, or features thereof, in FIGS. 7-13E may be implemented in combination with, or as an alternative to, other nanofibers, or features thereof, described herein, such as those described with reference to other embodiments and FIGS. The nanofibers of FIGS. 7-13E may additionally be utilized in any of the methods for making and/or using nanofibers described herein. The nanofibers of FIGS. 7-13E may also be used in various applications and/or in permutations, which may or may not be noted in the illustrative embodiments described herein. For instance, the nanofibers of FIGS. 7-13E may include more or less features/components than those shown in FIGS. 7-13E, in some embodiments. Moreover, the nanofibers of FIGS. 7-13E are also not limited to the size, shape, number of components/features, etc. specifically shown in FIGS. 7-13E. Further, as the nanofibers of FIGS. 7-13E may be variations of one another, like features or components are assigned the same reference number.

In some embodiments, the first layer 102 of the multicomponent nanofibers may comprise a first polymer, as disclosed herein, and the second layer 104 may comprise a second polymer, as disclosed herein. Additionally, the multicomponent nanofibers may comprise a third layer comprising a third polymer.

In some embodiments, at least two of the first, second, and third polymers may have different dipole moments from one another. In some embodiments, the first, second, and third polymers may each have difference dipole moments from one another.

In some embodiments, the first polymer may have a dipole moment that is greater than the dipole moment of at least the second polymer. In some embodiments, the first polymer may have a dipole moment that is greater than the second polymer and the third polymer. In some embodiments, the third polymer may have a dipole moment that is greater than the second polymer, but less than the first polymer. In some embodiments, the relative relationship between the dipole moments (μ) of the first polymer ($\mu_1$), the second polymer ($\mu_2$), and the third polymer ($\mu_3$) may be expressed according to any of the following:

$\mu_1 \geq \mu_2$ and/or $\mu_3$;

$\mu_1 \geq \mu_2 \geq \mu_3$;

$\mu_1 \geq \mu_3 \geq \mu_2$;

$\mu_1 \approx \mu_3 \geq \mu_2$;

$\mu_3 \geq \mu_1 \geq \mu_2$;

In some embodiments, the first and third polymers may each independently have a high dipole moment, and the second polymer may have a low dipole moment. In some embodiments, the first and third polymers may each independently have a high dipole moment, and the second polymer may have a low dipole moment, where the high dipole moments of the first and third polymer are about equal to one another. In some embodiments, the first and third polymers may each independently have a high dipole moment provided that the dipole moment of the first polymer is greater than that of the third polymer, and the second polymer may have a low dipole moment. In some embodiments, the first and third polymers may each independently have a high dipole moment provided that dipole moment of the third polymer is greater than that of the first polymer, and the second polymer may have a low dipole moment.

In some embodiments, the first polymer may have a dipole moment greater than about 2.0 D. In some embodiments, the second polymer may have a dipole moment less than about 1 D. In some embodiments, the third polymer may have a dipole moment equal to or greater than about 1 D. In some embodiments, the first polymer may have a dipole moment greater than about 2.0 D, the second polymer may have a dipole moment less than about 1 D, and the third polymer may have a dipole moment equal to or greater than about 1 D.

In some embodiments, the first, second, and third polymers may differ with respect to the degree of adhesiveness of the polymers. For instance, in some embodiments, the first polymer may comprise an adhesive material, and the second polymer and/or third polymer may each independently comprise a non-adhesive material or a material that is less-adhesive than that of the first polymer. In some embodiments, the first polymer and the third polymer may comprise an adhesive material (that may be the same or different from one another), and the second polymer may comprise a non-adhesive material or a material that is less-adhesive than that of the first and third polymers. In some embodiments, the first, second, and third polymers may comprise a different adhesive polymer or a different adhesive polymer composition from one another.

As discussed previously, exemplary adhesive materials may include, but are not limited to, a pressure sensitive adhesive polymer, a light sensitive adhesive polymer, a hot-melt adhesive polymer, or combinations thereof. Additional examples of adhesive materials include, but are not limited to, ethylene-vinyl acetate (EVA), polyolefins (PO), polyamides (PA), polyester, polyurethane (PU), an acrylic, bio-based acrylate, butyl rubber, nitriles, silicone rubber, styrene butadiene rubber, natural rubber latex, and combinations thereof.

Exemplary non-adhesive polymer materials may also include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly(ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), poly-phenylene terephthalamide, polytetrafluoroethylene, or combinations thereof.

Figure 7:
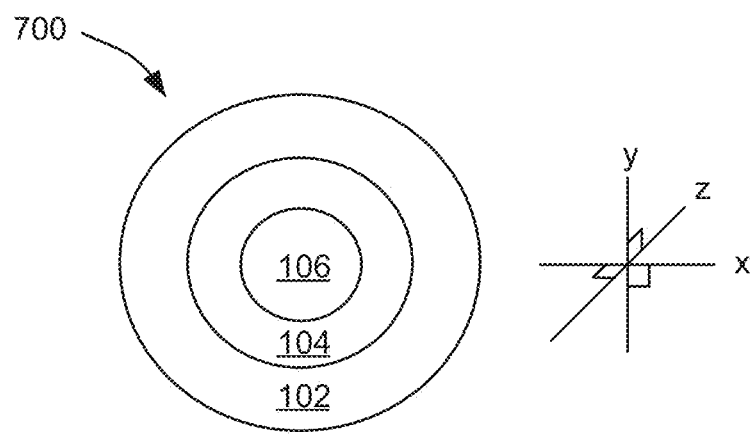
FIG. 7 is a cross-sectional view of a multicomponent nanofiber comprising a coaxial (sheath-core) structure, according to one embodiment.

Referring now to FIG. 7, a cross-sectional view of a multicomponent nanofiber 700 comprising a coaxial (sheath-core) structure is shown according to one embodiment, where the cross-section is taken perpendicular to the longitudinal axis of the multicomponent nanofiber 700. As shown in FIG. 7, the multicomponent, coaxial nanofiber 700 comprises an outer, first layer 102, an intermediate, second layer 104, and an innermost, third layer 106.

In some embodiments, the first layer 102 of the multicomponent, coaxial nanofiber 700 may comprise the first polymer, as disclosed herein, the second layer 104 may comprise the second polymer, as disclosed herein, and the third layer 106 may comprise the third polymer, as disclosed herein.

Figure 8:
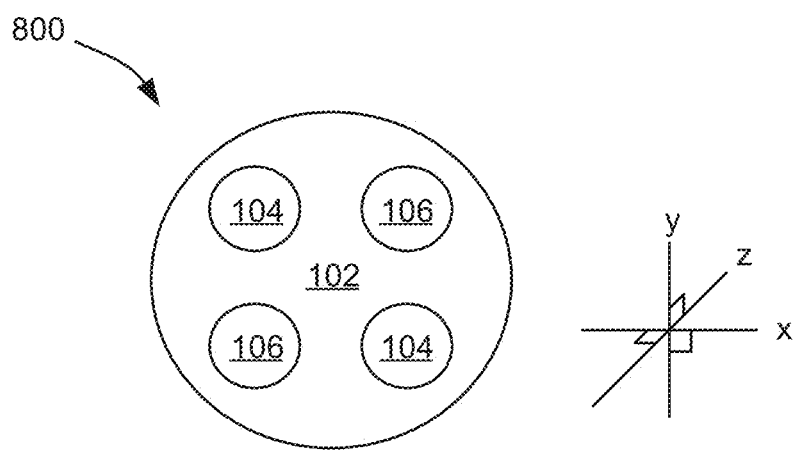
FIG. 8 is a cross-sectional view of a multicomponent nanofiber comprising a first type of "islands-in-sea" structure, according to one embodiment.

Referring now to FIG. 8, a cross-sectional view of a multicomponent nanofiber 800 comprising a first type of "islands-in-sea" structure is shown according to one embodiment, where the cross-section is taken perpendicular to the longitudinal axis of the nanofiber 800. In some embodiments, the multicomponent, islands-in-sea nanofiber 800 comprises the first layer 102 substantially surrounding/encircling two or more "islands," where at least one of the islands comprises the second layer 104 and at least another of the islands comprises the third layer 106. In the exemplary embodiment of FIG. 8, the multicomponent, islands-in-sea nanofiber 800 may comprise the first layer 102 substantially surrounding/encircling four separate islands, where two of the islands comprise the second layer 104, and two of the islands comprise the third layer 106. In some embodiments, however, the number of "islands" comprising the second and third layers 104, 106 may independently be any integer number equal to or greater than 2 (e.g., 3, 4, 5, 6, 7, 8, etc.). Moreover, in some embodiments, the multicomponent, islands-in-sea nanofiber 800 may comprise one or more additional islands each independently comprising an additional polymer material (e.g., a polymer material different than the first, second, and third polymers disclosed herein).

In some embodiments, the first layer 102 of the multicomponent, islands-in-sea nanofiber 800 may comprise the first polymer, as disclosed herein, the second layer 104 may comprise the second polymer, as disclosed herein, and the third layer 106 may comprise the third polymer, as disclosed herein.

Figure 9:
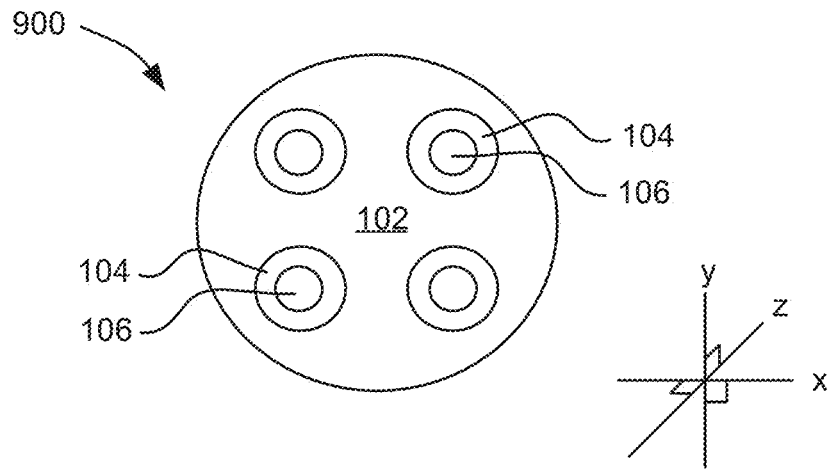
FIG. 9 is a cross-sectional view of a multicomponent nanofiber comprising a second type of "islands-in-sea" structure, according to one embodiment.

Referring now to FIG. 9, a cross-sectional view of a multicomponent nanofiber 900 comprising a second type of "islands-in-sea" structure is shown according to another embodiment, where the cross-section is taken perpendicular to the longitudinal axis of the nanofiber 900. In some embodiments, the multicomponent, islands-in-sea nanofiber 900 comprises the first layer 102 substantially surrounding/encircling at least two "islands," where each island comprises the second layer 104 substantially surrounding/encircling the third layer 106. In the exemplary embodiment of FIG. 9, the multicomponent, islands-in-sea nanofiber 900 may comprise the first layer 102 substantially surrounding/encircling four separate islands comprising the second and third layers 104, 106. In some embodiments, however, the number of "islands" comprising the second and third layers 104, 106 may be any integer number equal to or greater than 2 (e.g., 3, 4, 5, 6, 7, 8, etc.). Moreover, in some embodiments, the multicomponent, islands-in-sea nanofiber 900 may comprise one or more additional layers disposed within the third layer 106, where each additional layer independently comprising an additional polymer material (e.g., a polymer material different from the first, second, and third polymers disclosed herein).

In some embodiments, the first layer 102 of the multicomponent, islands-in-sea nanofiber 900 may comprise the first polymer, as disclosed herein, the second layer 104 may comprise the second polymer, as disclosed herein, and the third layer 106 may comprise the third polymer, as disclosed herein.

Figure 10B:
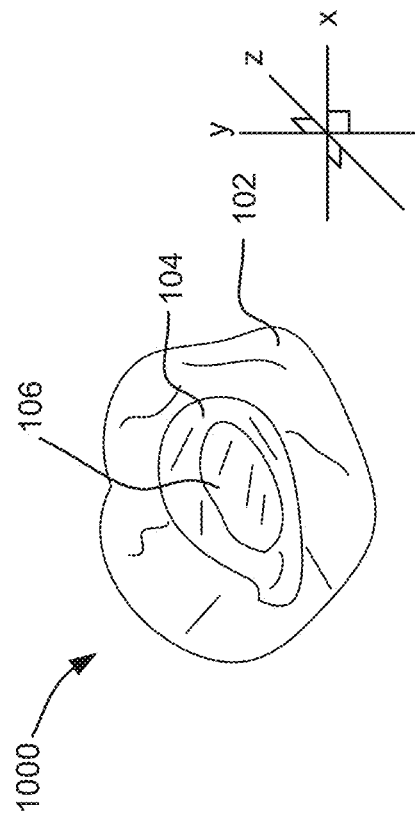
FIGS. 10B-10C are two cross-sectional views of the multicomponent, fully coated nanofiber of FIG. 10A taken at two different cross-sections thereof.
Figure 10C:
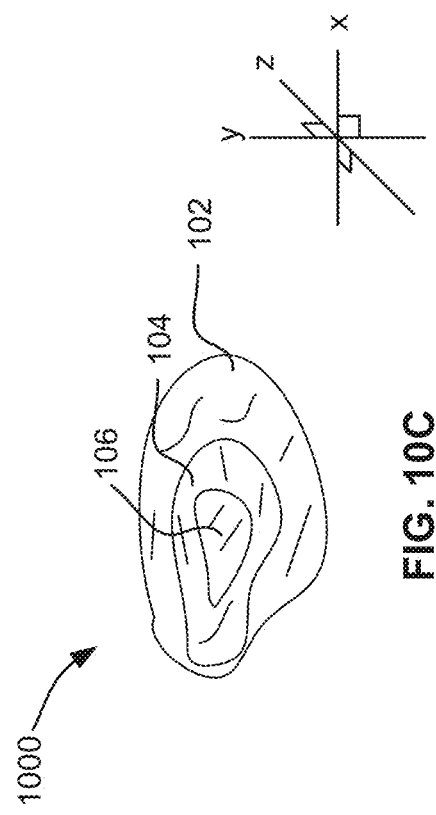
Figure 10A:
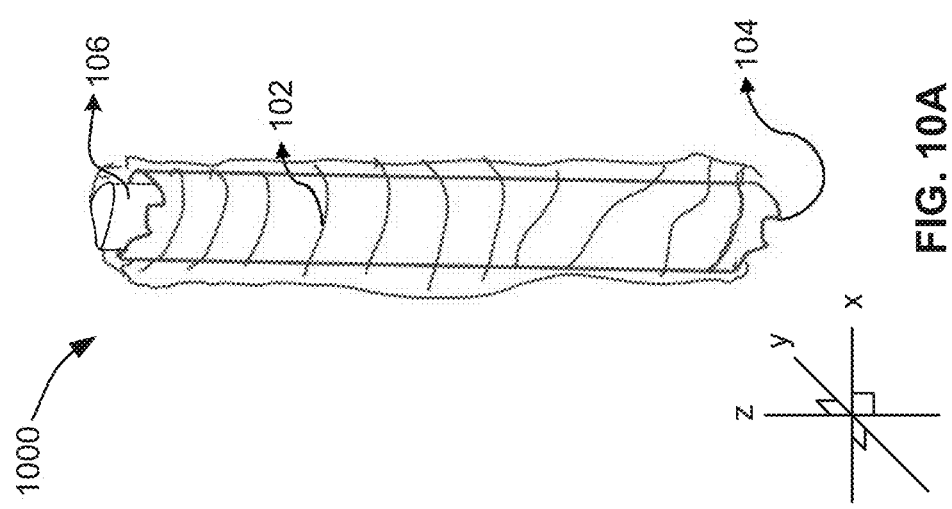
FIG. 10A is a side view of a multicomponent, fully coated nanofiber, according to one embodiment.

Referring now to FIG. 10A, a side view of a multicomponent, fully coated nanofiber 900 is shown according to one embodiment. As shown in FIG. 10A, the multicomponent, fully coated nanofiber 1000 comprises the first, second, and third layers 102, 104, 106, where the first layer 102 substantially coats the second layer 104, and the second layer 104 substantially coats the third layer 106. The multicomponent, fully coated nanofiber 1000 is similar to the multicomponent, coaxial nanofiber 700 shown in FIG. 7, except that the multicomponent, fully coated nanofiber 1000 does not have a substantially uniform cross-section. For instance, one or more cross-sections of the multicomponent, fully coated nanofiber 1000 may differ with respect to the shape and amount of the first and second layers 102, 104, as shown, e.g., in the two cross-sectional views provided in FIGS. 10B-10C. In some embodiments, the cross-sectional shape of the combination of the first, second, and third layers 102, 104, 106 may vary at each cross-section of the nanofiber 1000.

In some embodiments, the first layer 102 of the multicomponent, fully coated nanofiber 1000 may comprise the first polymer, as disclosed herein, the second layer 104 may comprise the second polymer, as disclosed herein, and third layer 106 may comprise the third polymer, as disclosed herein.

As discussed previously, the first polymer and the third polymer may each independently have a high dipole moment, and the second polymer may have a low dipole moment), in some embodiments. By way of example, the first polymer may have a dipole moment equal to or greater than about 2.0 D, the second polymer may have a dipole moment less than about 1.0 D, and third polymer may have a dipole moment equal to or greater than about 1.0 D. As such, the first high dipole moment polymer tends to have higher surface area, thus resulting in a high capability to retain particulate matter. The second, low dipole moment polymer may have a capability for grabbing particulate matters. The third high dipole moment polymer tends to be charged, thus resulting in a high electrostaticity for grabbing and retaining particulate matters. Accordingly, for the multicomponent nanofibers 700 (coaxial), 800 (islands-in-sea), 900 (islands-in-sea), 1000 (fully coated) in which the first, high dipole moment polymer is present in the first layer 102 (the external layer), the second, low dipole moment polymer is present in the second layer(s) 104 (the internal layer(s)), and the third, high dipole moment polymer is present in the third layer 106, the resulting nanofibers can simultaneously grab and retain particulate matter, which may be particularly useful for filtration applications.

Figure 11B:
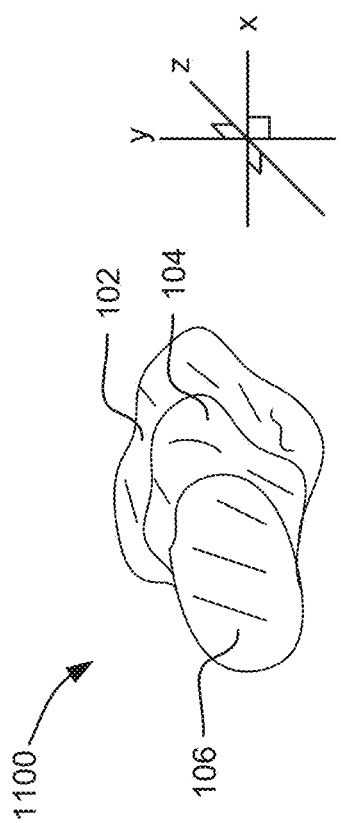
FIGS. 11B-11E are four cross-sectional views of the multicomponent, partially coated nanofiber of FIG. 11A taken at four different cross-sections thereof.
Figure 11C:
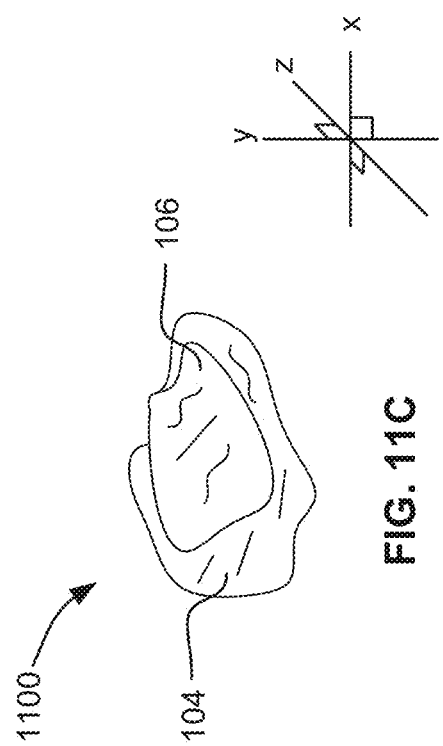
Figure 11A:
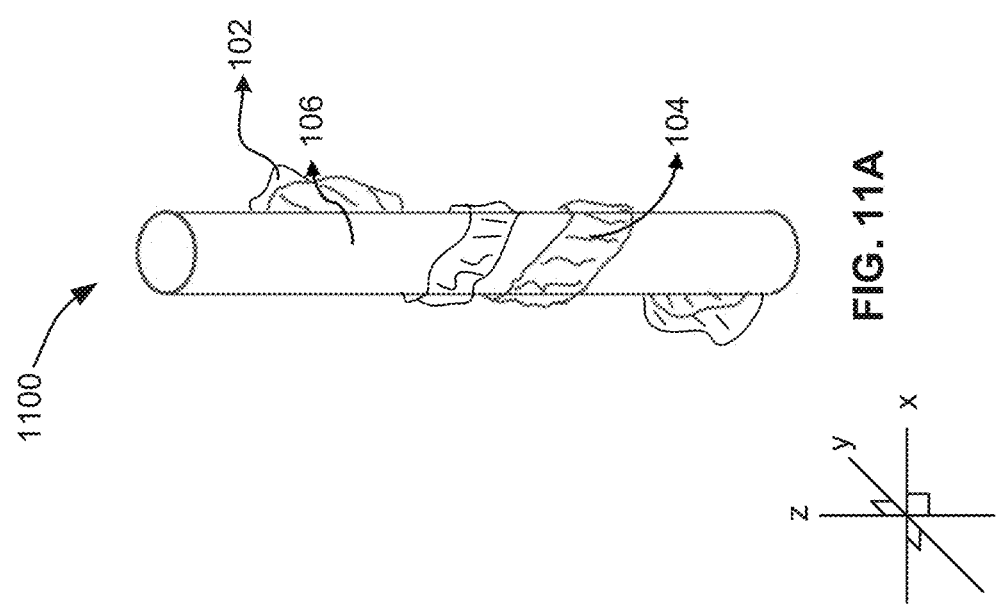
FIG. 11A is a side view of a multicomponent, partially coated nanofiber, according to one embodiment.
Figure 11D:
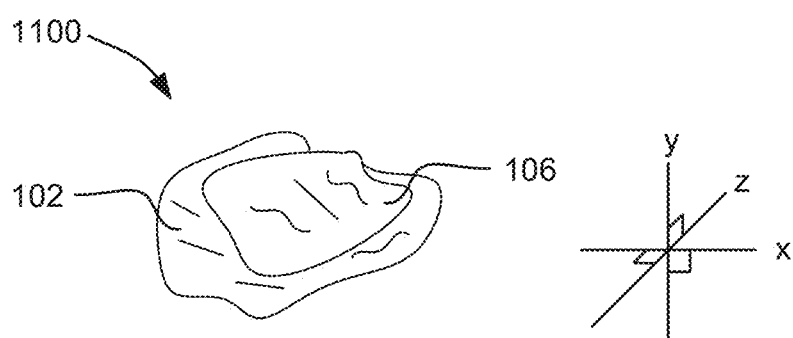

Referring now to FIG. 11A, a side view of a multicomponent, partially coated nanofiber 1100 is shown according to one embodiment. As shown in FIG. 11A, the multicomponent, partially coated nanofiber 1100 comprise the innermost, third layer 106 partially coated by the first layer 102 or the second layer 104 or a combination thereof. In contrast to the multicomponent, fully coated nanofiber 1000 of FIGS. 10A-10C, the first layer 102 and the second layer 104 of the multicomponent, partially coated nanofiber 1100 does not coat (e.g. surround/encircle) all portions of the innermost third layer 106.

Figure 11E:
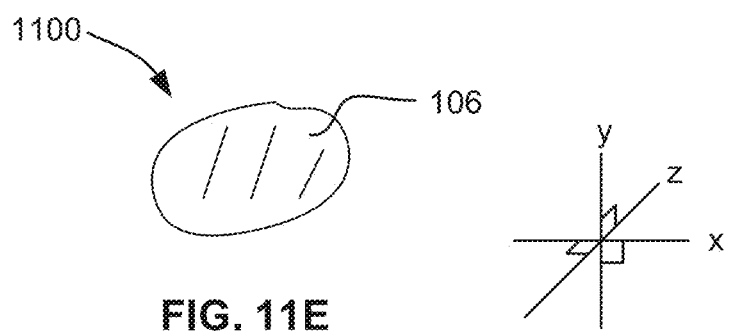

However, similar to the multicomponent, fully coated nanofiber 1000 of FIGS. 10A-10C, the multicomponent, partially coated nanofiber 1100 does not have a uniform cross-section. For instance, one or more cross-sections of the multicomponent, partially coated nanofiber 1100 may differ with respect to the shape and amount of the first layer 102 and/or the second layer 106 surrounding/encircling the innermost third layer 106, as shown, e.g., in the three cross-sectional views provided in FIGS. 11B-11D. As also shown in FIG. 11E, there may be one or more regions of the multicomponent, partially coated nanofiber 1100 that include solely the third layer 106 with no coating of the first layer 102 and/or the second layer 104 thereon.

In some embodiments, the first layer 102 of the multicomponent, partially coated nanofiber 1100 may comprise the first polymer, as disclosed herein, the second layer 104 may comprise the second polymer, as disclosed herein, and the third layer 106 may comprise the third polymer, as disclosed herein.

Figure 12:
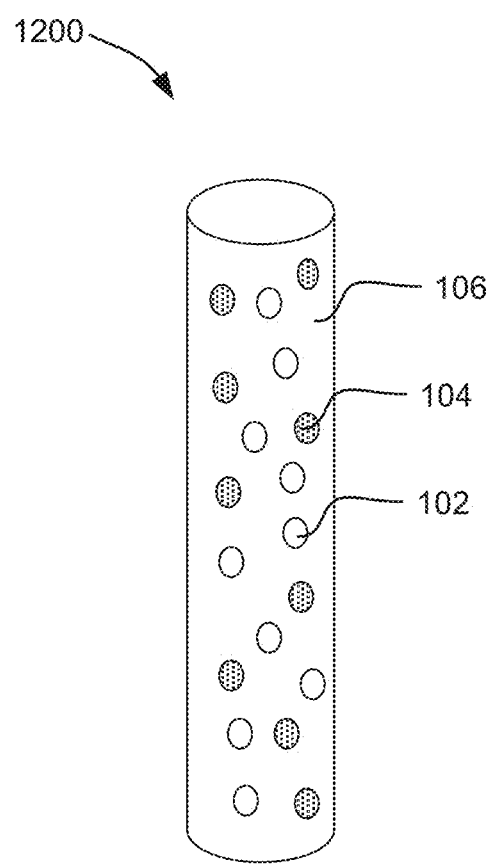
FIG. 12 is a side view of a multicomponent, dispersed, according to one embodiment.

Referring now to FIG. 12, a side view of a multicomponent, dispersed nanofiber 1200 is shown according to one embodiment. As shown in FIG. 12, the bicomponent, dispersed nanofiber 1200 comprises a dispersion of the first layer 102, the second layer 104, and the third layer 106. In some embodiments, the bicomponent, dispersed nanofiber 1200 may comprise a uniform dispersion of the first layer 102, the second layer 104, and the third layer 106. In the particular embodiment of FIG. 12, the first and second layer 102, 104 are dispersed within the third layer 106.

In some embodiments, the first layer 102 of the multicomponent, dispersed nanofiber 1200 may comprise the first polymer, as disclosed herein, the second layer 104 may comprise the second polymer, as disclosed herein, and the third layer 106 may comprise the third polymer, as disclosed herein.

Referring now to FIG. 13A, a side view of a multicomponent, aggregate nanofiber 1300 is shown according to one embodiment. As shown in FIG. 13A, the multicomponent, aggregate nanofiber 1300 comprises the first layer 102 or the second layer 104 or a combination thereof dispersed within one or more portions of the third layer 106. In contrast to the multicomponent, dispersed nanofiber 1200 of FIG. 12, the first layer 102 and/or the second layer 104 of the multicomponent, aggregate nanofiber 1300 is dispersed only within certain portions, and not throughout substantially the entirety, of the third layer 106.

Figure 13D:
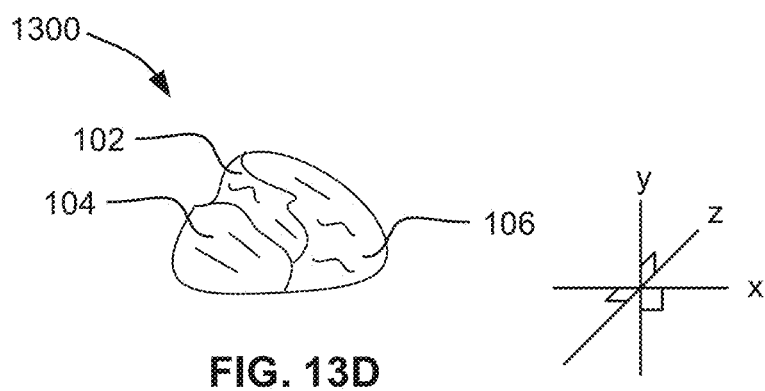
Figure 13E:
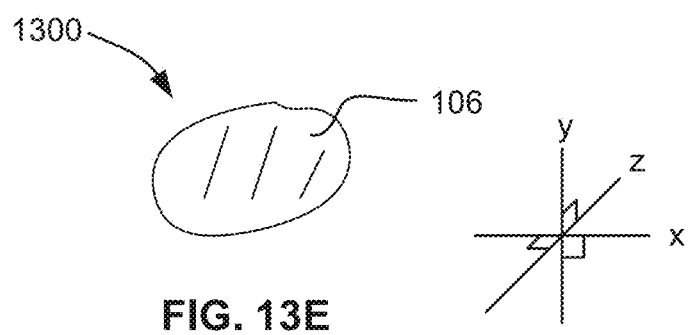

The multicomponent, aggregate nanofiber 1300 does not have a uniform cross-section. For instance, one or more cross-sections of the multicomponent, aggregate nanofiber 1300 may differ with respect to the shape and amount of the first layer 102 and/or the second layer 104 dispersed within the third layer 106, as shown, e.g., in the three cross-sectional views provided in FIGS. 13B-13D. As also shown in FIG. 13E, there may be one or more regions of the multicomponent, aggregate nanofiber 1300 that include solely the third layer 106 with none of the first layer 102 dispersed within.

In some embodiments, the first layer 102 of the multi-component, aggregate nanofiber 1300 may comprise the first polymer, as disclosed herein, the second layer 104 may comprise the second polymer, as disclosed herein, and the third layer 106 may comprise the third polymer, as disclosed herein.

As discussed previously, the first polymer and the third polymers may each independently have a high dipole moment (e.g., the first polymer may have a dipole moment equal to or greater than about 2.0 D, and the third polymer may have a dipole moment equal to or greater than about 1.0 D) and be hydrophilic, whereas the second polymer may have a low dipole moment (e.g., less than about 1.0 D) and be hydrophobic. In such embodiments, the multicomponent nanofibers 1100 (partially coated), 1200 (dispersed), 1300 (aggregate) may be used as a drug carrier or other carriers for fine chemistry, where the first and third hydrophilic polymers with the high dipole moment will release a drug or chemicals quickly in an aqueous process, and the second, hydrophobic polymer with the low dipole moment will release the drug or chemicals slowly in an aqueous process. Accordingly, said multicomponent nanofibers 1100, 1200, 1300 attached to at least two drugs or chemicals can successively release the at least two drugs or chemicals in an aqueous process.

2. Systems

Provided herein are various, customizable systems configured to produce the nanofibers disclosed herein (e.g., the nanofibers shown in FIGS. 1-13E).

a. Spinneret Systems

For instance, FIGS. 14A-14K describe a system 1400 comprising at least one spinneret 1402 configured to form bicomponent or multicomponent nanofibers. In some embodiments, the materials to be formed into the dual or multicomponent nanofibers exit, or are drawn from, the spinneret 1402 toward a substrate 1404 to form a layer 1406 of the dual or multicomponent nanofibers thereon. In some embodiments, the substrate 1404 may be conductive. In some embodiments, the substrate 1404 may be non-conductive.

Figure 14A:
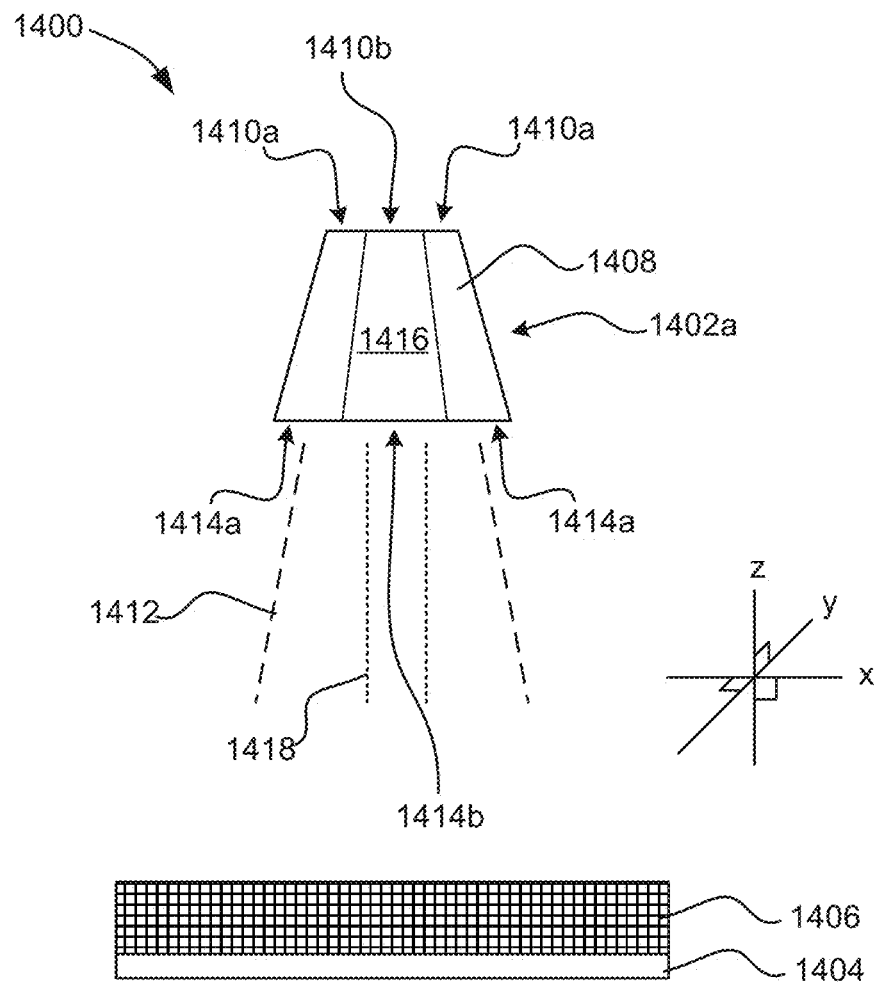
FIGS. 14A-14K show various views of a system configured for formation of bicomponent or multicomponent nanofibers, according to various embodiments. For instance.
Figure 14B:
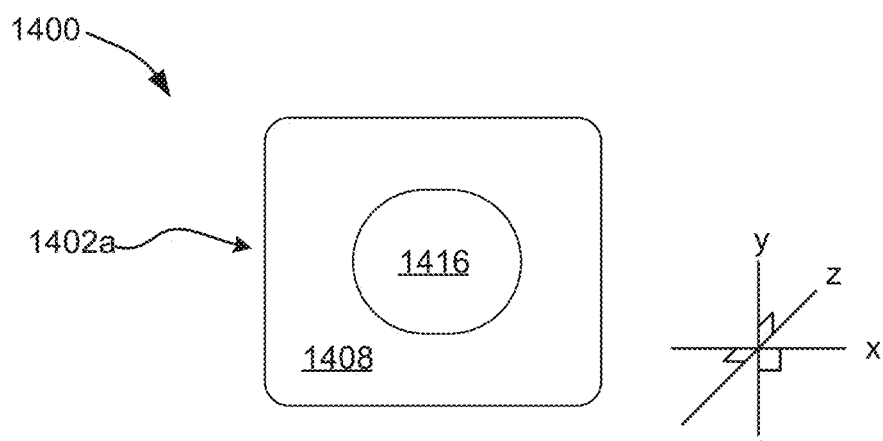

FIGS. 14A-14B provide a cross-sectional and a top-down view, respectively, of an embodiment in which the system 1400 comprises at least one spinneret 1402a configured to form bicomponent, coaxial ("sheath-core") nanofibers (such as described, e.g., in FIG. 1). The at least one spinneret 1402a may comprise at least one of a first channel 1408 having a first surface 1410a in fluid communication with a first source (not shown) of a first polymer 1412 (e.g., solution or melt comprising the first polymer), and a second surface 1414a from with the first polymer 1412 is extruded. The at least one spinneret 1402a may further comprise at least one of a second channel 1416 having a first surface 1410b in fluid communication with a second source (not shown) of a second polymer 1418 (e.g., a solution or melt comprising the second polymer), and a second surface 1414b from which the second polymer 1418 is extruded. In some embodiments, the first and second channels 1408, 1416 may simultaneously extrude the first and second polymer 1412, 1418 to form bicomponent, coaxial nanofibers, which may travel, or are drawn, toward the substrate 1404 to form the layer 1406 thereupon.

In some embodiments, the first channel 1408 may be positioned along one or more portions of the outer periphery of the spinneret 1402a, whereas the second channel 1416 may be positioned within an interior portion of the spinneret 1402a. In some embodiments, the first channel 1408 may be concentrically disposed about the inner, second channel 1416.

In some embodiments, the second channel 1416 may have a cross-sectional shape that is substantially rounded (e.g., circular, elliptical, etc.). In some embodiments, the first channel 1408 may have a cross sectional shape that is substantially rounded (e.g., circular, elliptical, etc.), square, rectangular, irregular, or other such suitable shape as would become apparent to a skilled artisan upon reading the present disclosure. In some embodiments, both the first and second channels 1408, 1416 may have a rounded (e.g., circular, elliptical, etc.) cross-sectional shape.

As disclosed herein, the first polymer 1412 and the second polymer 1418 may have different dipole moments, in some embodiments. For instance, in some embodiments, the first polymer 1412 may have a high dipole moment (e.g., equal to or greater than about 2.0 D), and the second polymer 1418 may a low dipole moment (e.g., less than about 1.0 D), as disclosed herein.

In some embodiments, the first and second polymers 1412, 1418 may differ with respect to the degree of adhesiveness of the polymers. For instance, in some embodiments, the first polymer 1412 may comprise an adhesive material, and the second polymer 1418 may comprise a non-adhesive material or a material that is less-adhesive than that of the first polymer 1412.

Exemplary adhesive materials may include, but are not limited to, a pressure sensitive adhesive polymer, a light sensitive adhesive polymer, a hot-melt adhesive polymer, or combinations thereof. Additional examples of adhesive materials include, but are not limited to, ethylene-vinyl acetate (EVA), polyolefins (PO), polyamides (PA), polyester, polyurethane (PU), an acrylic, bio-based acrylate, butyl rubber, nitriles, silicone rubber, styrene butadiene rubber, natural rubber latex, and combinations thereof.

Exemplary non-adhesive polymer materials may include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly(ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), polyphenylene terephthalamide, polytetrafluoroethylene, or combinations thereof.

Figure 14C:
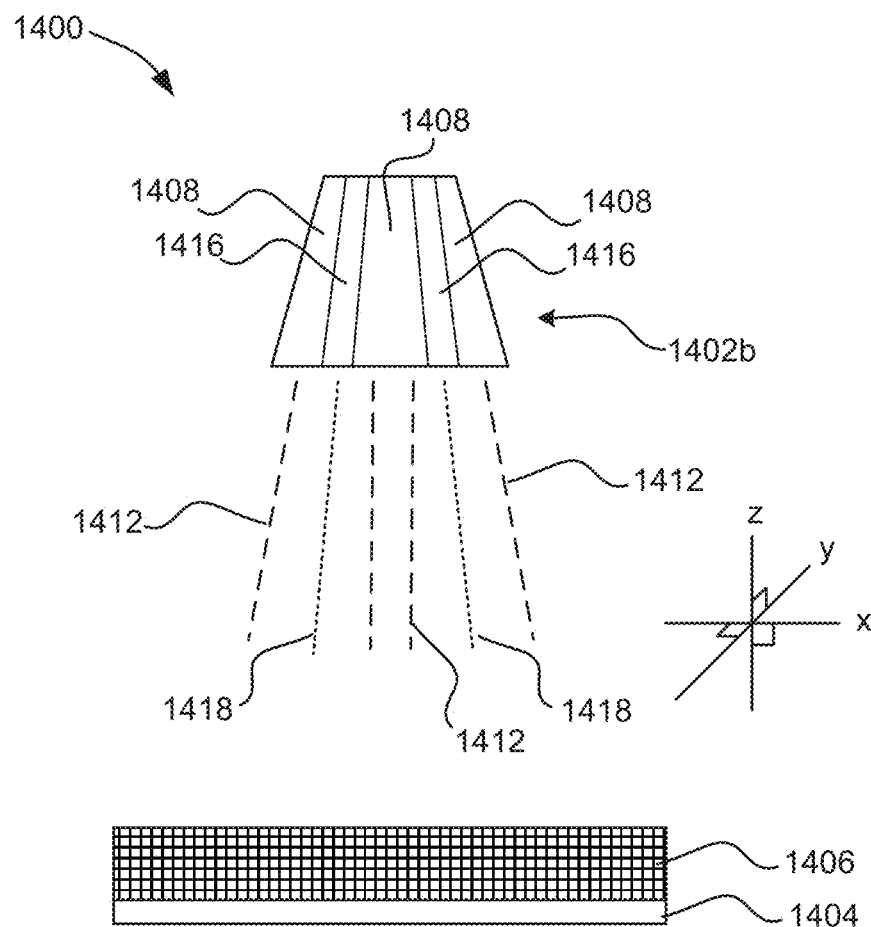
Figure 14D:
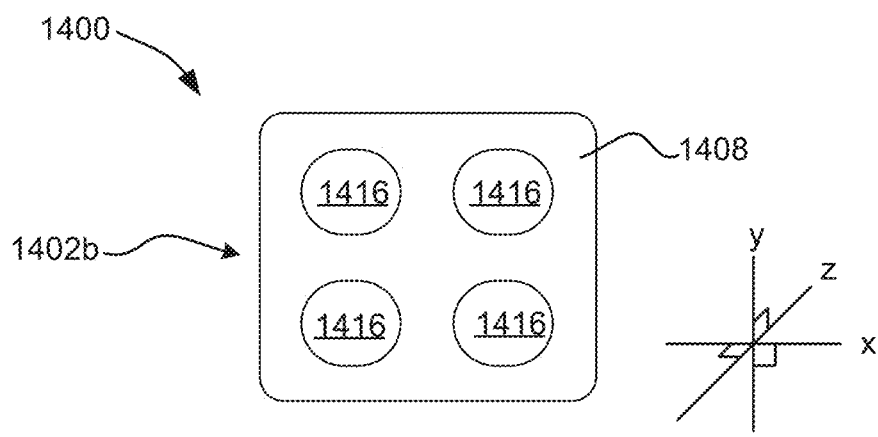

FIGS. 14C-14D provide a cross-sectional and a top-down view, respectively, of another embodiment in which the system 1400 comprises at least one spinneret 1402b configured to form bicomponent, islands-in-sea nanofibers (such as described, e.g., in FIG. 2). As shown in the top down view provided in FIG. 14D, the at least one spinneret 1402b may, in some embodiments, comprise four of the second channels 1416 in spaced relation with one another, and further disposed within an interior portion of the first channel 1408. In some embodiments, the first and second channels 1408, 1416 may simultaneously extrude the first and second polymers 1412, 1418, respectively, to form bicomponent, islands-in-sea nanofibers, which may travel, or be drawn, toward the substrate 1404 to form the single layer 1420 thereupon.

It is of note that the at least one spinneret 1402*b* of FIGS. 14C-14D is not limited to the number or configuration of the second channels 1416. Rather, the at least one spinneret 1402*b* may include any number or configuration of the second channels 1416 so as to achieve a desired number and configuration of the second polymer 1416 "islands" disposed within the "sea" of the first polymer 1412.

In some embodiments, the second channel 1416 of spinneret 1402*b* may have a cross-sectional shape that is substantially rounded (e.g., circular, elliptical, etc.). In some embodiments, the first channel 1408 of spinneret 1402*b* may have a cross sectional shape that is substantially rounded (e.g., circular, elliptical, etc.), square, rectangular, irregular, or other such suitable shape as would become apparent to a skilled artisan upon reading the present disclosure. In some embodiments, both the first and second channels 1408, 1416 of spinneret 1402*b* may have a rounded (e.g., circular, elliptical, etc.) cross-sectional shape.

Figure 14E:
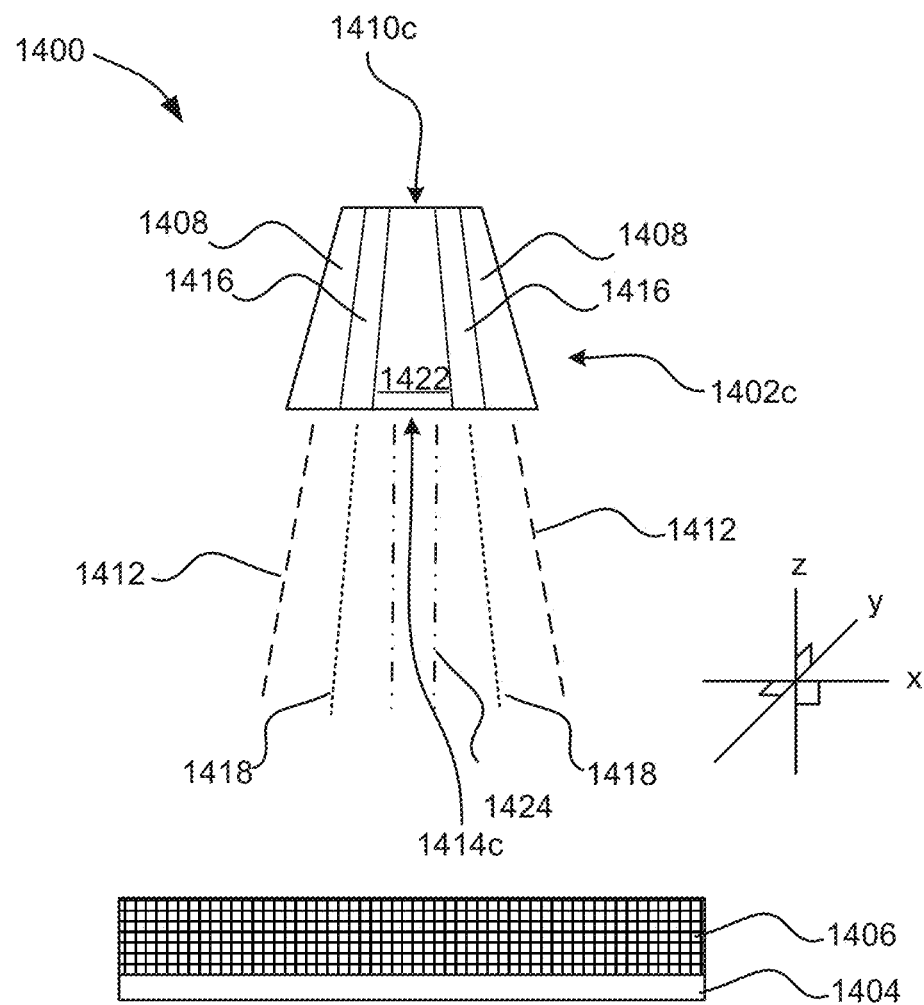
Figure 14F:
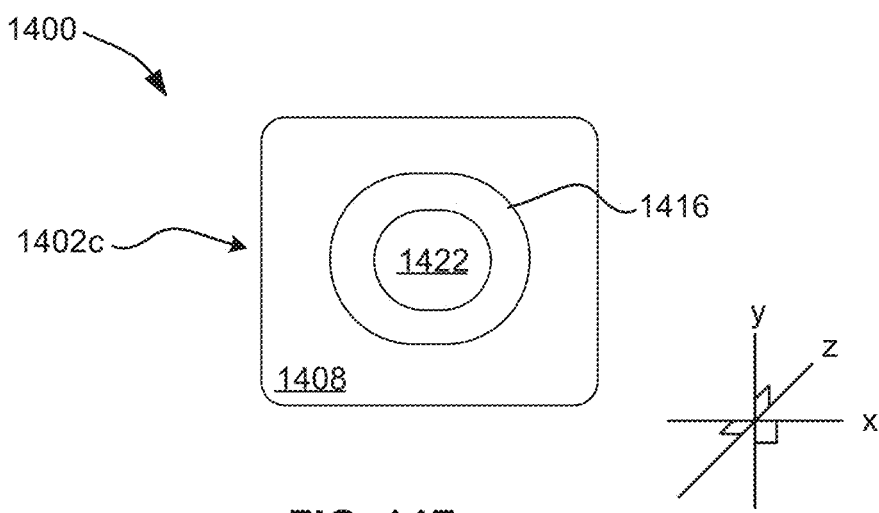

FIGS. 14E-14F provide a cross-sectional and top-down view, respectively, of an embodiment in which the system 1400 comprises at least one spinneret 1402*c* configured to form multicomponent, coaxial ("sheath") nanofibers (such as described, e.g., in FIG. 7). The at least one spinneret 1402*c* may comprise at least the first channel 1408 and at least the second channel 1416 configured to extrude the first polymer 1412 and the second material 1418, respectively, as described above. The at least one spinneret 1402*b* may further comprise at least a third channel 1422 having a first surface 1410*c* in fluid communication with a third source (not shown) of a third polymer 1424 (e.g., a solution or melt comprising the third polymer), and a second surface 1414*c* from which the third polymer 1424 is extruded. In some embodiments, the first, second, and third channel 1408, 1416, 1422 may simultaneously extrude the first, second, and third polymers 1412, 1418, 1424, respectively to form multicomponent, coaxial nanofibers, which may travel, or be drawn, toward the substrate 1404 to form the single layer 1406 thereupon.

As disclosed herein, at least two of the first, second, and third polymers may have different dipole moments from one another. In some embodiments, the first, second, and third polymers may each have difference dipole moments from one another.

In some embodiments, the first polymer may have a dipole moment that is greater than the dipole moment of at least the second polymer. In some embodiments, the first polymer may have a dipole moment that is greater than the second polymer and the third polymer. In some embodiments, the third polymer may have a dipole moment that is greater than the second polymer, but less than the first polymer. In some embodiments, the relative relationship between the dipole moments ($\mu$) of the first polymer ($\mu_1$), the second polymer ($\mu_2$), and the third polymer ($\mu_3$) may be expressed according to any of the following:

$\mu_1 \geq \mu_2$ and/or $\mu_3$;

$\mu_1 \geq \mu_2 \geq \mu_3$;

$\mu_1 \geq \mu_3 \geq \mu_2$;

$\mu_1 \approx \mu_3 \geq \mu_2$;

$\mu_3 \geq \mu_1 \geq \mu_2$;

In some embodiments, the first and third polymers may each independently have a high dipole moment, and the second polymer may have a low dipole moment. In some embodiments, the first and third polymers may each independently have a high dipole moment, and the second polymer may have a low dipole moment, where the high dipole moments of the first and third polymer are about equal to one another. In some embodiments, the first and third polymers may each independently have a high dipole moment provided that dipole moment of the first polymer is greater than that of the third polymer, and the second polymer may have a low dipole moment. In some embodiments, the first and third polymers may each independently have a high dipole moment provided that dipole moment of the third polymer is greater than that of the first polymer, and the second polymer may have a low dipole moment.

In some embodiments, the first polymer may have a dipole moment greater than about 2.0 D. In some embodiments, the second polymer may have a dipole moment less than about 1 D. In some embodiments, the third polymer may have a dipole moment equal to or greater than about 1 D. In some embodiments, the first polymer may have a dipole moment greater than about 2.0 D, the second polymer may have a dipole moment less than about 1 D, and the third polymer may have a dipole moment equal to or greater than about 1 D.

In some embodiments, the first, second, and third polymers may differ with respect to the degree of adhesiveness of the polymers. For instance, in some embodiments, the first polymer may comprise an adhesive material, and the second polymer and/or third polymer may each independently comprise a non-adhesive material or a material that is less-adhesive than that of the first polymer. In some embodiments, the first polymer and the third polymer may comprise an adhesive material (that may be the same or different from one another), and the second polymer may comprise a non-adhesive material or a material that is less-adhesive than that of the first and third polymers. In some embodiments, the first, second, and third polymers may comprise a different adhesive polymer or a different adhesive polymer composition from one another.

As discussed previously, exemplary adhesive materials may include, but are not limited to, a pressure sensitive adhesive polymer, a light sensitive adhesive polymer, a hot-melt adhesive polymer, or combinations thereof. Additional examples of adhesive materials include, but are not limited to ethylene-vinyl acetate (EVA), polyolefins (PO), polyamides (PA), polyester, polyurethane (PU), an acrylic, bio-based acrylate, butyl rubber, nitriles, silicone rubber, styrene butadiene rubber, natural rubber latex, and combinations thereof.

Exemplary non-adhesive polymer materials may also include, but are not limited to, polypropylene, polyethylene, poly(ethylene oxide), polyethylene terephthalate, nylon, polyvinyl alcohol, polyvinylpyrrolidone, polyvinylidene fluoride, polystyrene, polypropylene, polyethylene, poly (ethylene oxide), polyethylene terephthalate, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), poly-phenylene terephthalamide, polytetrafluoroethylene, or combinations thereof.

With continued reference to FIGS. 14E-14F, the third channel 1422, in some embodiments, may be positioned within the innermost region of the spinneret 1402*c*, the second channel 1416 may surround one or more portions of the third channel 1422, and the first channel 1408 may surround one or more portions of the second channel 1416. In some embodiments, the second channel 1416 may be concentrically disposed about the innermost third channel 1422, and the first channel 1408 may be concentrically disposed about the middle, second channel 1416.

In some embodiments, the second channel 1416 and/or the third channel 1422 may each independently have a cross-sectional shape that is substantially rounded (e.g., circular, elliptical, etc.). Moreover, as noted previously, the first channel 1408 may have a cross sectional shape that is substantially rounded (e.g., circular, elliptical, etc.), square, rectangular, irregular, or other such suitable shape, in some embodiments. In some embodiments, each of the first, second, and third channels 1408, 1416, 1422 may have a rounded (e.g., circular, elliptical, etc.) cross-sectional shape.

Figure 14G:
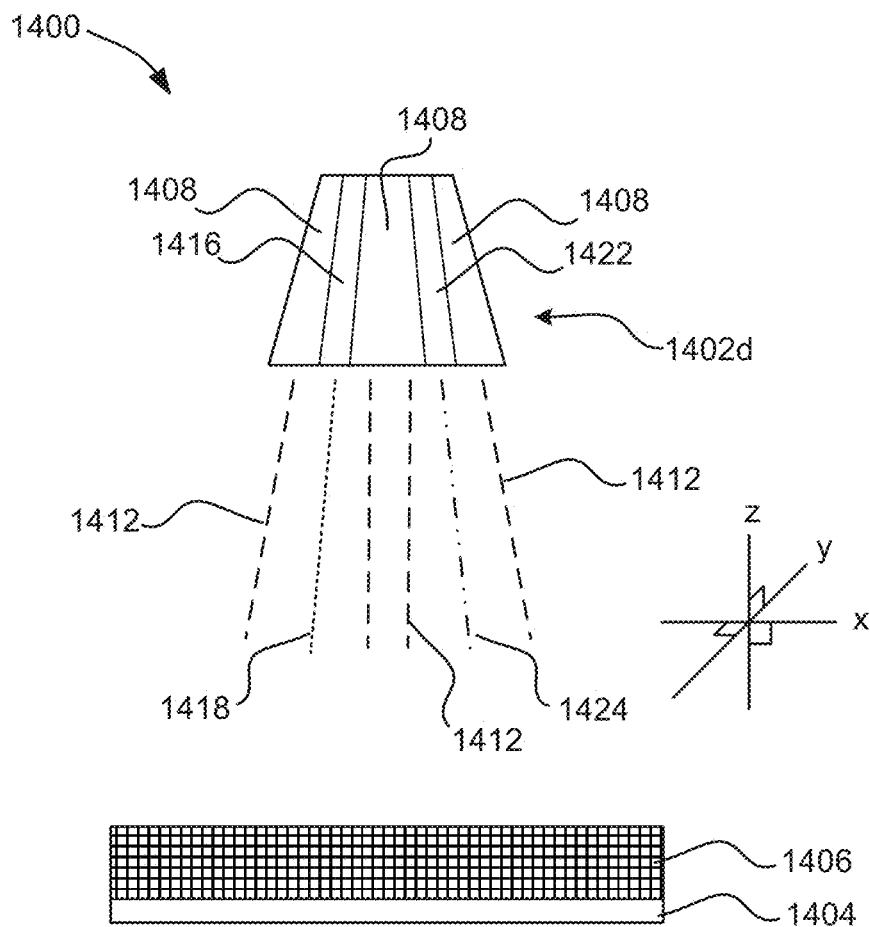

In some embodiments, the second and third channels 1416, 1422 may not be concentrically disposed. For instance, FIGS. 14G-14I1 provide a cross-sectional and a top-down view, respectively, of another embodiment in which the system 1400 comprises at least one spinneret 1402d having at least two, non-overlapping second channels 1416 configured to extrude the second polymer 1418, and at least two, non-overlapping three channels 1422 configured to extrude the third polymer 1424. Such configuration may produce a first type of multicomponent, islands-in-sea nanofiber such as described, e.g., in FIG. 8.

Figure 14H:
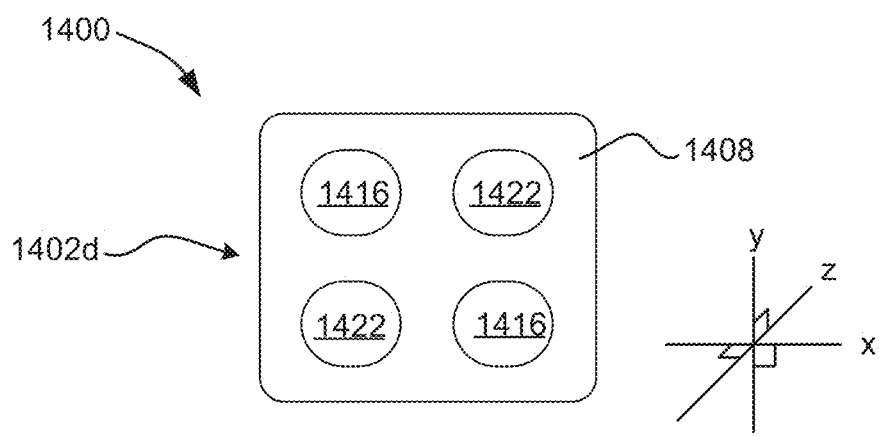
Figure 14I:
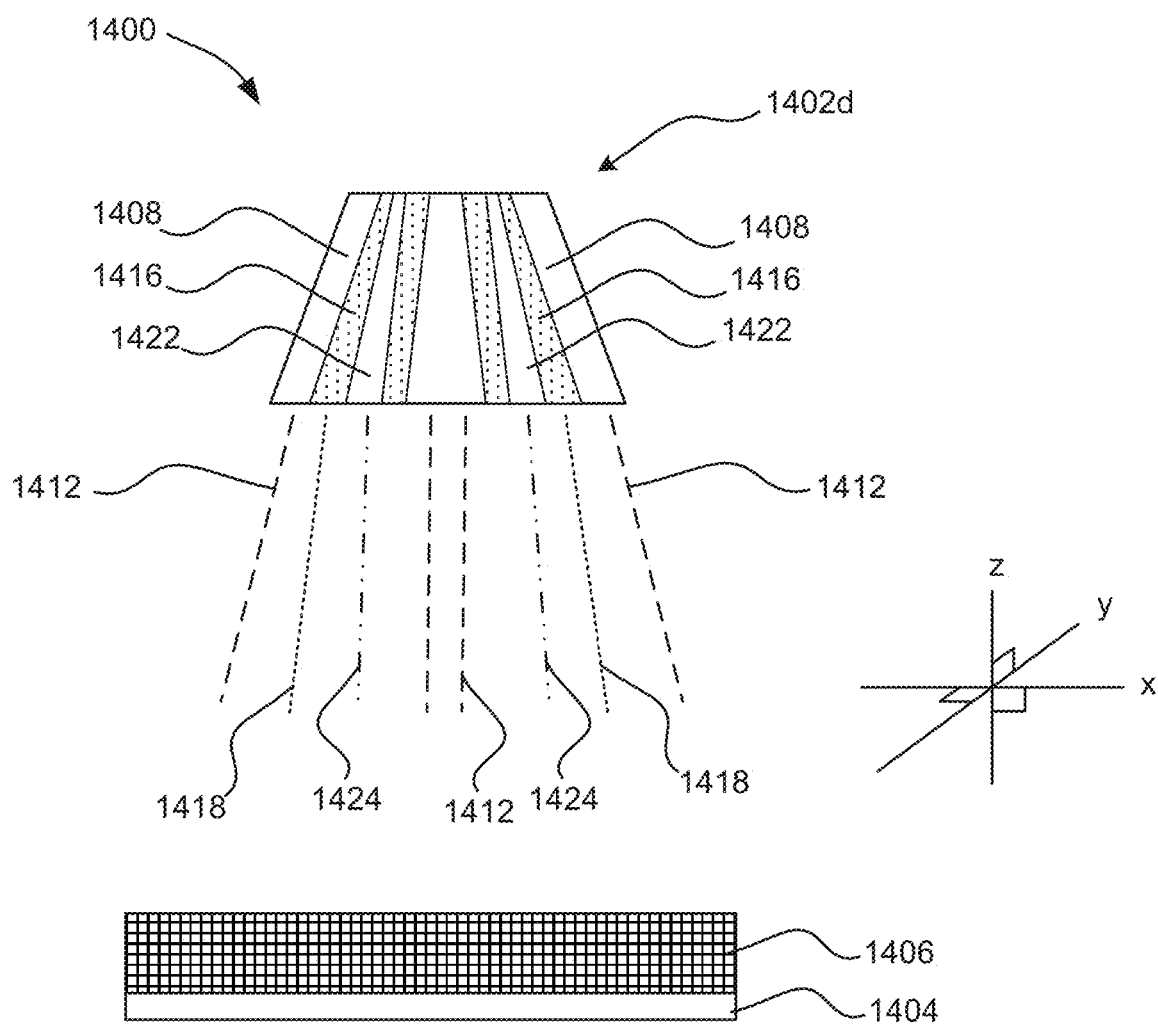
Figure 14J:
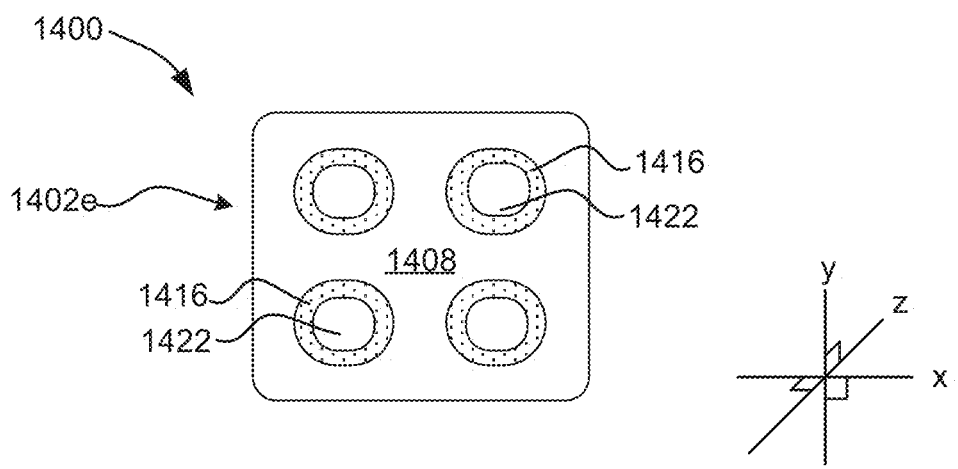

FIGS. 14I-14J provide a cross-sectional and top-down view of an embodiment in which the system 1400 comprises at least one spinneret 1402e configured to form a second type of multicomponent, islands-in-sea nanofiber (as described, e.g., in FIG. 9). As shown in the top down view provided in FIG. 14J, the at least one spinneret 1402e may comprise four of the second channels 1416 in spaced relation with one another, and further disposed within an interior portion of the first channel 1408, where each of the second channels 1416 are concentrically disposed around an inner third channel 1422. In some embodiments, the first, second, and third channels 1408, 1416, 1422 may simultaneously extrude the first, second, and third polymers 1412, 1418, 1424, respectively, to form multicomponent, islands-in-sea nanofibers, which may travel, or be drawn, toward the substrate 1404 to form the single layer 1406 thereupon.

It is of note that the at least one spinneret 1402e of FIGS. 14I-14J is not limited to the number or configuration of the second channels 1416 or third channels 1422. Rather, the spinneret 1402e may include any number or configuration of the second channels 1416 and/or third channels 1422 so as to achieve a desired number and configuration of the "islands" comprising the second polymer 1418 and/or the third polymer 1424, and which are disposed within the "sea" of the first material 1412.

In some embodiments, the second channel 1416 and/or the third channel 1422 of spinneret 1402e may each independently have a cross-sectional shape that is substantially rounded (e.g., circular, elliptical, etc.). Moreover, the first channel 1408 of spinneret 1402e may have a cross sectional shape that is substantially rounded (e.g., circular, elliptical, etc.), square, rectangular, irregular, or other such suitable shape, in some embodiments. In some embodiments, each of the first, second, and third channels 1408, 1416, 1422 of spinneret 1402e may have a rounded (e.g., circular, elliptical, etc.) cross-sectional shape.

Figure 14K:
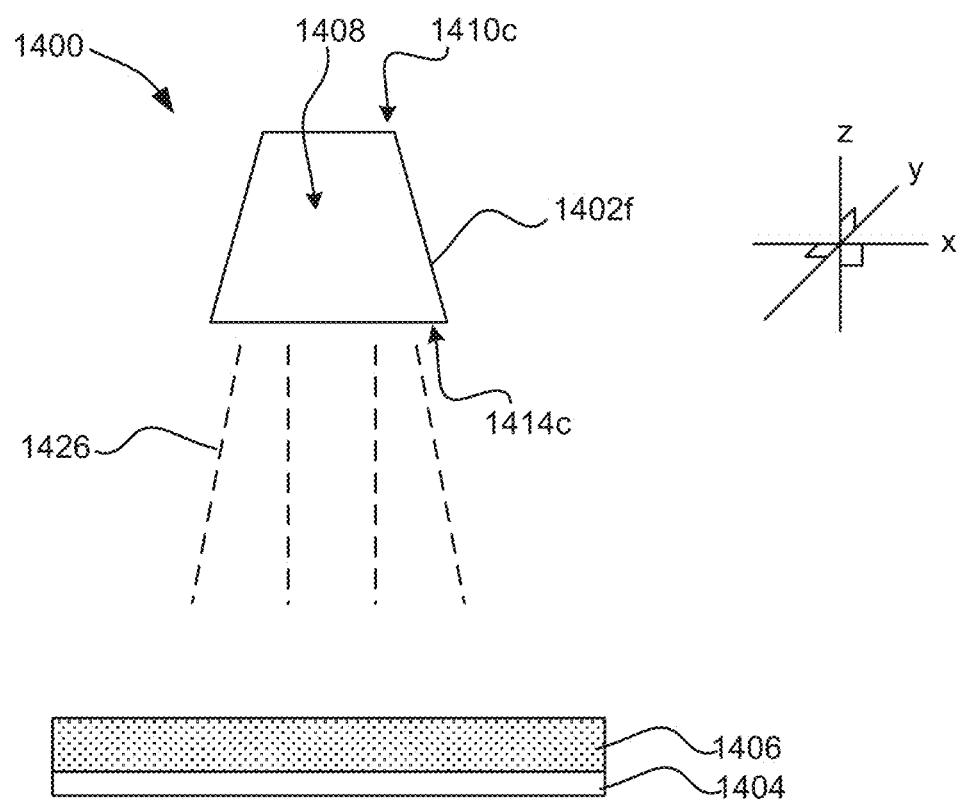

FIG. 14K provides a cross-sectional view of an embodiment in which the system 1400 comprises at least one spinneret 1402f configured to form bicomponent or multicomponent fully coated, partially coated, dispersed, or aggregate nanofibers (as described, e.g., in FIGS. 10A-10C, 11A-11E, 12, 13A-13E). As shown in FIG. 14K, the spinneret 1402f comprise a single channel 1408 having a first surface 1410c in fluid communication with solution comprising a mixture of at least two polymers, and a second surface 1414c from which the combination of polymers 1426 is extruded. For instance, in some embodiments, the solution, and therefore the resulting polymers 1426, may comprise a mixture of the first and second polymers 1412, 1418. In some embodiments, the solution, and therefore the resulting polymers 1426, may comprise a mixture of the first, second, and third polymers 1412, 1418, 1424. In some embodiments, the solution may be a homogenous mixture of the respective polymers. In some embodiments, the solution may a non-homogeneous mixture of the respective polymers. During the extrusion process, phase separation of the polymers will occur, thereby resulting in nanofibers comprising irregular arrangements of said polymers (e.g., bicomponent or multicomponent fully coated nanofibers as shown in FIGS. 3A-3C and FIGS. 10A-10C, respectively; bicomponent or multicomponent partially coated nanofibers as shown in FIGS. 4A-4D and FIGS. 11A-11E, respectively; bicomponent or multicomponent dispersed as shown in FIG. 5 and FIG. 12, respectively; or bicomponent or multicomponent aggregate nanofibers as shown in FIGS. 6A-6D and FIGS. 13A-13E, respectively.

In some embodiments, the single channel 1408a of spinneret 1402f may have a cross sectional shape that is substantially rounded (e.g., circular, elliptical, etc.), square, rectangular, irregular, or other such suitable shape, in some embodiments. In some embodiments, the single channel 1408 of spinneret 1402f may have a cross sectional shape that is substantially rounded.

In some embodiments, the system 1400 described in any of FIGS. 14A-14K may extrude the desired polymers via an electrospinning of electrospraying process. Cross-sectional, side views of simplified schematics of such an electrospinning or electrospraying process is provided in FIGS. 15A-15C.

As shown in FIGS. 15A-15C, a power source 1502 may be operatively coupled to the at least one spinneret 1402 (e.g., spinneret 1402a, 1402b, 1402c, 1402d, 1402e, or 1402f) and configured to supply a high voltage thereto. When a sufficiently high voltage is applied to a liquid droplet formed near the surface 1504 of the spinneret 1402, the body of the liquid becomes charged, and electrostatic repulsion counteracts the surface tension such that the droplet is stretched, and, at a critical point, a stream of liquid erupts from the surface 1504. In instances where the molecular cohesion of the liquid is sufficiently high, stream breakup does not occur (if stream breakup does occur, droplets are electrosprayed) and a charged liquid jet is formed. As the jet dries in flight, the mode of current flow changes from ohmic to convective as the charge migrates to the surface of the fiber. The jet is then elongated by a whipping process caused by electrostatic repulsion initiated at small bends in the fiber, until it is finally deposited on the ground collector (substrate 1506). The elongation and thinning of the fiber resulting from this bending instability leads to the formation of uniform fibers with nanometer-scale diameters, in some embodiments.

As also shown in FIGS. 15A-15C, such electrospinning (or electrospraying) process may be a top-down process in which the at least one spinneret 1402 (e.g., spinneret 1402a, 1402b, 1402c, 1402d, 1402e, or 1402f) is vertically positioned above the substrate 1506 (FIG. 15A), and the nanofibers are generated downward; a bottom-up process in which the substrate 1506 is vertically positioned above the spinneret 1402 (FIG. 15B), and the nanofibers are generated in an upward direction; or a vertical process in which the substrate 1506 is horizontally positioned relative to the spinneret 1402 (FIG. 15C), and the fibers are generated in horizontal/side-ways direction.

With continued reference to FIGS. 14A-14K, the system 1400 may comprise, in some embodiments, a single spinneret 1402, e.g., a single spinneret 1402a configured to extrude a bicomponent, coaxial nanofibers; a single spinneret 1402b configured to extrude bicomponent, islands-in-sea nanofibers; a single spinneret 1402c configured to extrude multicomponent, coaxial nanofibers; a single spinneret 1402d configured to extrude a first type of multicomponent, islands-in-sea nanofibers; a single spinneret 1403e configure to extrude a second type of multicomponent, islands-in-sea nanofiber; or a single spinneret 1402f configured to extrude fully coated, partially coated, dispersed, or aggregate nanofibers. See, e.g., FIG. 16A for an exemplary schematic of a system comprising a single type of spinneret.

In some embodiments, the system 1400 may comprise a plurality of spinnerets 1402, where each spinneret 1402 is independently a spinneret 1402a configured to extrude bicomponent, coaxial nanofibers; a spinneret 1402b configured to extrude bicomponent, islands-in-sea nanofibers; a spinneret 1402c configured to extrude multicomponent, coaxial nanofibers; a spinneret 1402d configured to extrude a first type of multicomponent, islands-in-sea nanofibers; a spinneret 1403e configure to extrude a second type of multicomponent, islands-in-sea nanofibers; or a spinneret 1402f configured to extrude fully coated, partially coated, dispersed, or aggregate nanofibers. In some embodiments, the system 1400 may comprise a plurality of spinnerets, where each spinneret is of the same type (e.g., spinneret 1402a, spinneret 1402b, spinneret 1402c, spinneret 1402d, spinneret 1402e, or spinneret 1402f). In some embodiments, the system 1400 may comprise a plurality of spinnerets 1402, where at least two spinnerets 1402 are of a different type (e.g., spinneret 1402a, spinneret 1402b, spinneret 1402c, spinneret 1402d, spinneret 1402e, or spinneret 1402f) from one another. See, e.g., FIG. 16B for an exemplary schematic of a system comprising a plurality of spinnerets.

Figure 16A:
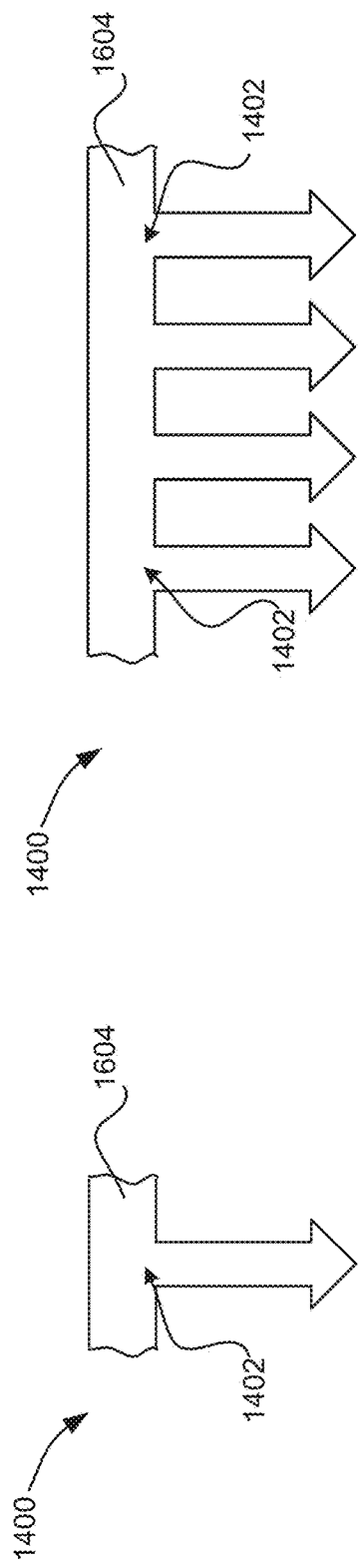
FIGS. 16A-16C are cross-sectional, side views of a system for forming bicomponent or multicomponent nanofibers, where the system comprises a single spinneret (FIG. 16A), a plurality of spinnerets (FIG. 16B), and at least two sets/groups of spinnerets configured to extrude different materials or different combinations of materials (FIG. 16C), according to various embodiments.
Figure 16B:
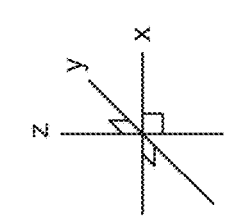

In other embodiments in which the system 1400 may comprise a plurality of spinnerets 1402, as described, e.g., in FIG. 16B, at least one spinneret may be configured to extrude a first polymer, e.g., and at least another spinneret may be configured to extrude a second polymer material, where the first and second polymers comprise a different composition, dipole moment, and/or degree of adhesiveness, as one another.

In some embodiments, the system 1400 may comprise at least two, at least three, at least four, etc. sets/groups 1602 (a, b, c, etc.) of spinnerets 1402, where each set/group may independently comprise at least two spinnerets 1402. In some embodiments, at least one of said sets/groups may comprise a different type of spinneret (e.g., spinneret 1402a, spinneret 1402b, spinneret 1402c, spinneret 1402d, spinneret 1402e, or spinneret 1402f) as compared to the type of spinnerets of at least another of said set/groups. In some embodiment, at least two of said sets/groups may comprise the same type of spinneret (e.g., spinneret 1402a, spinneret 1402b, spinneret 1402c, spinneret 1402d, spinneret 1402e, or spinneret 1402f). See, e.g., FIG. 16C for an exemplary schematic of a system comprising at least four sets/groups of spinnerets.

Figure 16C:
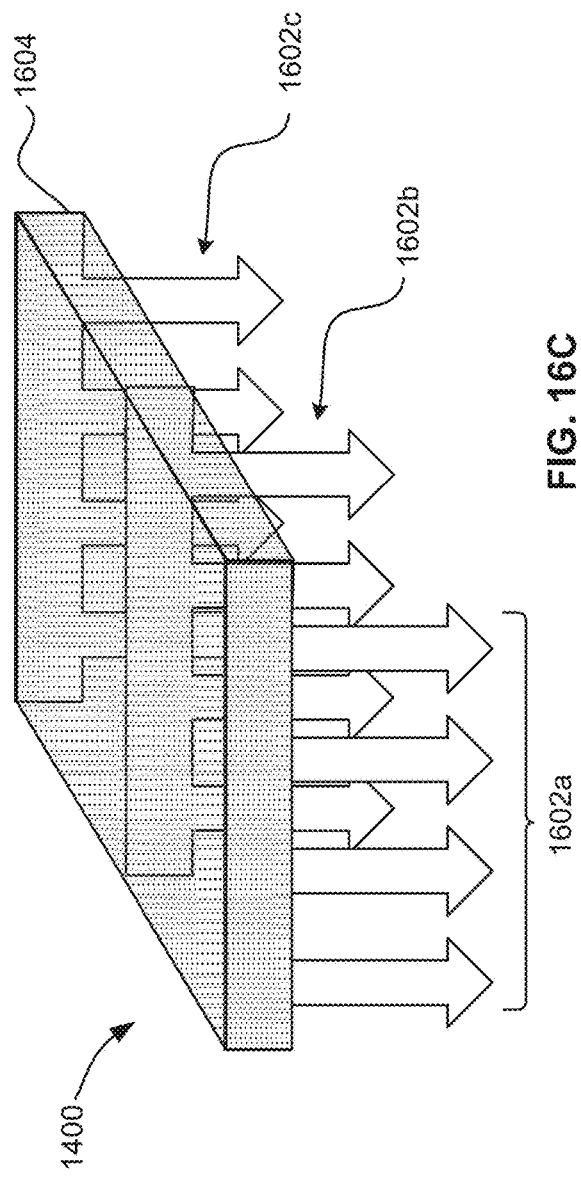

In other embodiments in which the system 1400 may comprise a plurality of spinnerets 1402, as described, e.g., in FIG. 16C, at least one of the sets (e.g., 1602a) of spinnerets may be configured to extrude a first polymer, e.g., and at least another of the sets (e.g., 1602b) of spinnerets may be configured to extrude a second polymer material, where the first and second polymers comprise a different composition, dipole moment, and/or degree of adhesiveness, as one another.

In embodiments in which the system 1400 comprises a single spinneret 1402 (e.g., as shown in FIG. 16A) or a plurality of spinnerets 1402 (e.g., as shown in FIGS. 16B-16C), the system 1400 may comprise a scaffold 1604 that is coupled to, and supports, the spinneret(s) 1402. In some embodiments, the scaffold 1604, and particularly the outer periphery thereof, may have a shape selected from a rectangle, a triangle, a parallelogram, an echelon, a hexagon, an octagon, a circle, a square, or an irregular shape.

In some embodiments, the scaffold 1602 may comprise a total number of spinnerets 1402 ranging from about 1 spinneret to about 5000 spinnerets, about 5 to about 2500 spinnerets, about 10 to about 1000 spinnerets, or about 20 to about 500 spinnerets. In some embodiments, the scaffold 1602 may comprise a total number of spinnerets 1402 ranging between and including any two of the following values: about 1, about 2, about 4, about 6, about 8, about 10, about 12, about 14, about 16, about 18, about 20, about 40, about 60, about 80, about 100, about 120, about 140, about 160, about 180, about 200, about 220, about 240, about 260, about 280, about 300, about 320, about 340, about 360, about 380, about 400, about 420, about 440, about 460, about 480, about 500, about 520, about 540, about 560, about 580, about 600, about 620, about 640, about 660, about 680, about 700, about 720, about 740, about 760, about 780, about 800, about 820, about 840, about 860, about 880, about 900, about 920, about 940, about 960, about 980, about 1000, about 1050, about 1100, about 1150, about 1200, about 1250, about 1300, about 1350, about 1400, about 1450, about 1500, about 1550, about 1600, about 1650, about 1700, about 1750, about 1800, about 1850, about 1900, about 1950, about 2000, about 2050, about 2100, about 2150, about 2200, about 2250, about 2300, about 2350, about 2400, about 2450, about 2500, about 2550, about 2600, about 2650, about 2700, about 2750, about 2800, about 2850, about 2900, about 2950, about 3000, about 3050, about 3100, about 3150, about 3200, about 3250, about 3300, about 3350, about 3400, about 3450, about 3500, about 3550, about 3600, about 3650, about 3700, about 3750, about 3800, about 385, about 3900, about 3950, about 4000, about 4050, about 4100, about 4150, about 4200, about 4250, about 4300, about 4350, about 4400, about 4450, about 4500, about 4550, about 4600, about 4650, about 4700, about 4750, about 4800, about 4850, about 4900, about 4950, and about 5000.

b. Needleless (or Needle-Free) Systems

In some embodiments, the nanofibers disclosed herein may be formed via systems comprising one or more needle-free (or needleless) spinnerets. FIGS. 17A-17D provide exemplary schematics of a system comprising at least one needle-free spinneret 1702, according to various embodiments.

Figure 17B:
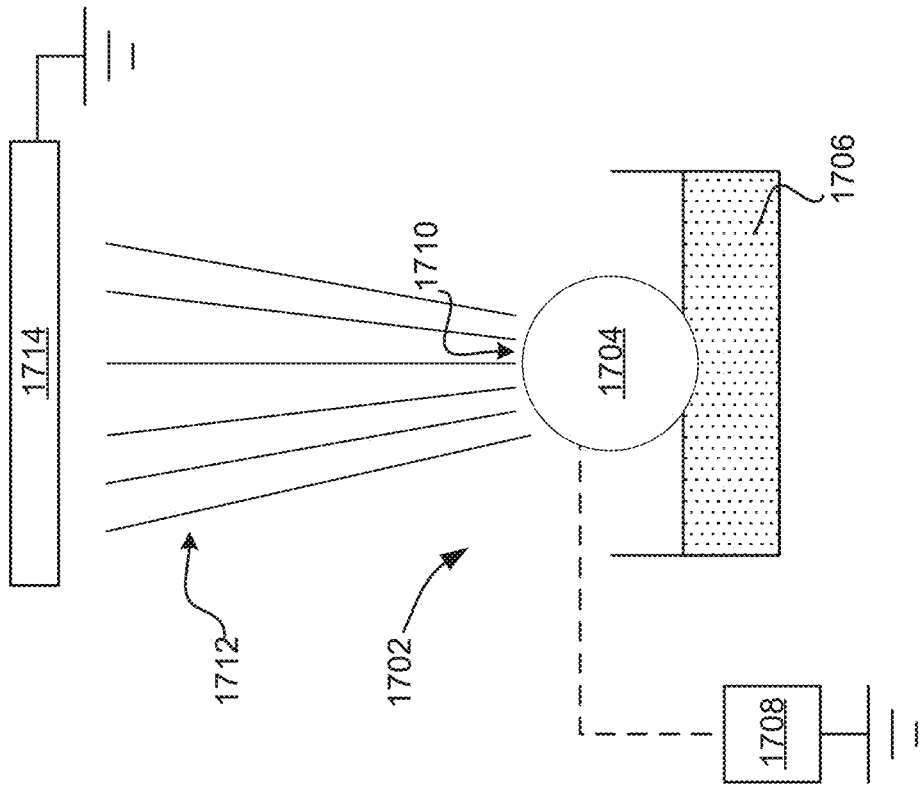
FIGS. 17A-17B are cross-sectional, side views of a needleless (or needle-free) system comprising a solution dipping component having a rough surface (FIG. 17A) or a smooth surface (FIG. 17B).
Figure 17A:
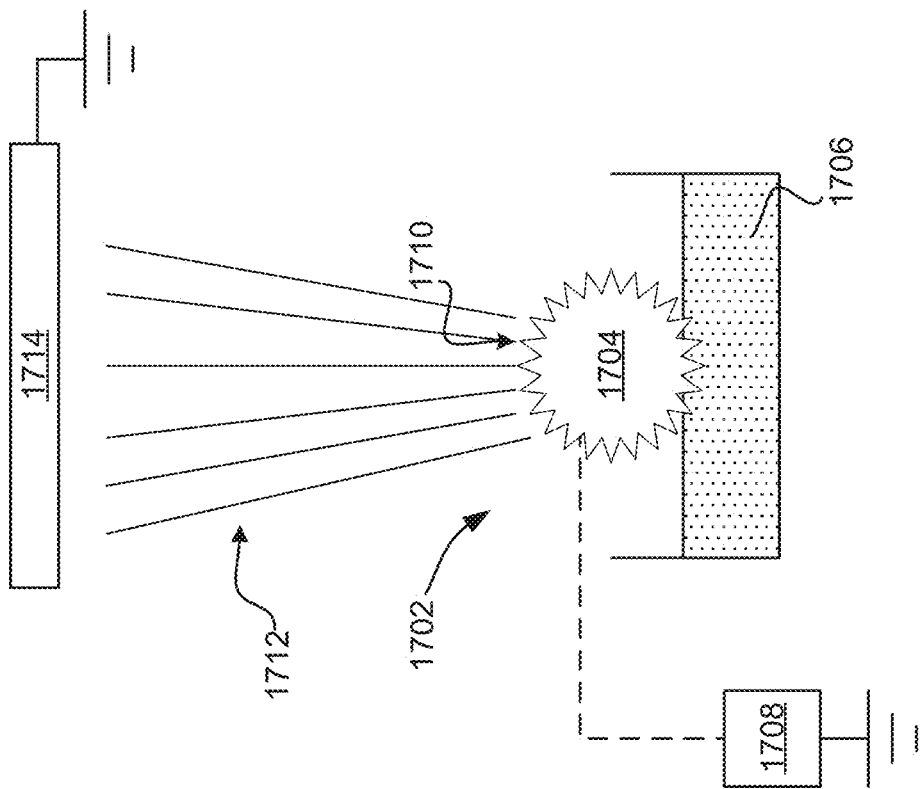

As shown in FIGS. 17A-17B, the needle-free spinneret 1702 may comprise a solution dipping component (particle) 1704 in contact with a mixture 1706 (i.e., the source of the material to be formed into fiber). In some embodiments, the mixture 1706 may comprise a first solution comprising at least a first polymer, as disclosed herein, and a second solution comprising at least a second polymer, as disclosed herein. In some embodiments in which the mixture 1706 comprises at least a first polymer solution and at least a second polymer solution, the ratio of the first polymer solution to the second polymer solution is about 100:1 to about 1:100. In some embodiments in which the mixture 1706 comprises at least a first polymer solution and at least a second polymer solution, the ratio of the first polymer solution to the second polymer solution is about 100:1 to about 1:1, about 75:1 to about 1:1, about 50:1 to about 1:1, about 25:1 to about 1:1, about 10:1 to about 1:1, about 5:1 to about 1:1, or about 1:1. In some embodiments in which the mixture 1706 comprises at least a first polymer solution and at least a second polymer solution, the ratio of the first polymer solution to the second polymer solution is about 1:100 to about 1:1, about 1:75 to about 1:1, about 1:50 to about 1:1, about 1:25 to about 1:1, about 1:10 to about 1:1, about 1:5 to about 1:1, or about 1:1. In some embodiments in which the mixture 1706 comprises at least a first polymer solution and at least a second polymer solution, the ratio of the first polymer solution to the second polymer solution is about 1:1.

In some embodiments, the mixture 1706 may comprise a solution comprising at least the first polymer, as disclosed herein, a second solution comprising the second polymer, as disclosed herein, and a third solution comprising a third polymer, as disclosed herein.

In some embodiments, the mixture 1706 may be a homogeneous mixture of the respective polymers. In some embodiments, the mixture 1706 may be a non-homogenous mixture of the respective polymers. In some embodiments, phase separation of the polymers in the mixture 1706 may occur during the extrusion process from the needle-free spinneret 1702, thereby forming bicomponent or multicomponent nanofibers, where each nanofiber independently comprises one of the irregular arrangements, or any combination thereof, of the respective polymers as disclosed herein (e.g., bicomponent or multicomponent fully coated nanofibers as shown in FIGS. 3A-3C and FIGS. 10A-10C, respectively; bicomponent or multicomponent partially coated nanofibers as shown in FIGS. 4A-4D and FIGS. 11A-11E, respectively; bicomponent or multicomponent dispersed as shown in FIG. 5 and FIG. 12, respectively; or bicomponent or multicomponent aggregate nanofibers as shown in FIGS. 6A-6D and FIGS. 13A-13E, respectively.

For instance, in some embodiments the mixture 1706 may comprise a solution comprising the first and second polymers, as disclosed herein, where phase separation thereof during the extrusion process results in a plurality of bicomponent nanofibers, each of which independently comprises a fully coated structure (see, e.g., FIGS. 3A-3C), a partially coated structure (see, e.g., FIGS. 4A-4D), a dispersed structure (see, e.g., FIG. 5), an aggregate structure (see, e.g., FIGS. 6A-6D), or combinations thereof. In some embodiments, one or more of the resulting bicomponent nanofibers may comprise a combination of two or more of the aforementioned structures. One example of such a combination may be where at least one of the bicomponent nanofibers has a dispersed structure (e.g., with the first layer dispersed within/throughout the second layer), where one or more portions of said bicomponent, dispersed nanofiber also has a partially coated structure (e.g., is also partially coated with the first layer).

In some embodiments the mixture 1706 may comprise a solution comprising the first, second, and third polymers, as disclosed herein, where phase separation thereof during the extrusion process results in a plurality of multicomponent nanofibers, each of which independently comprises a fully coated structure (see, e.g., FIGS. 10A-10C), a partially coated structure (see, e.g., FIGS. 11A-11E), a dispersed structure (see, e.g., FIG. 12), an aggregate structure (see, e.g., FIGS. 13A-13E), or combinations thereof. In some embodiments, one or more of the resulting multicomponent nanofibers may comprise a combination of two or more of the aforementioned structures. One example of such a combination may be where at least one of the multicomponent nanofibers has a dispersed structure (e.g., with the first layer and second layers dispersed within/throughout the third layer), where one or more portions of said multicomponent, dispersed nanofiber also has a partially coated structure (e.g., is also partially coated with the first and/or second layers).

As also shown in FIGS. 17A-17B, the needle-free spinneret 1702 may be operatively coupled to a power source 1708 configured to supply a high voltage thereto. In some embodiments, such as shown, e.g., in FIGS. 17A-17B, the power source 1708 may be coupled to the solution dipping component 1704. However, in some embodiments, power source 1708 may be coupled to the dipping solution 1706, and particularly the container in which said dipping solution 1706 is disposed.

The solution dipping component 1704 may be configured to rotate, such that the mixture is loaded onto, and covers, the surface 1710 of the dipping component 1704. The mixture 1706 may form conical spikes on the surface 1710 of the dipping component 1704 due to rotation thereof. Upon application of a sufficiently high voltage, the conical spikes may concentrate the electrical charges and further stretch (e.g., form Taylor cones) when the electrostatic repulsion counteracts the surface tension. Once a critical point is reached, streams of liquid (e.g., solution jets) may erupt from the surface 1710 of the of the dipping component 1704 to form the bicomponent or multicomponent nanofibers 1712, which are collected on the ground collector (e.g., substrate 1714) positioned vertically above the needle-free spinneret 1702.

In some embodiments, the dipping component 1704 may have a spherical, elliptical, or otherwise rounded shape. In some embodiments, the dipping component 1704 may be a rotatable roller or ball.

In some embodiments, the surface 1710 of the dipping component 1704 may be rough or smooth. FIG. 17A illustrates one embodiment in which the surface 1710 of the dipping component 1704 is rough, and particularly comprises a plurality of fabricated spikes. Conversely, FIG. 17B illustrates one embodiment in which the surface 1710 of the dipping component 1704 is substantially smooth.

Figure 17D:
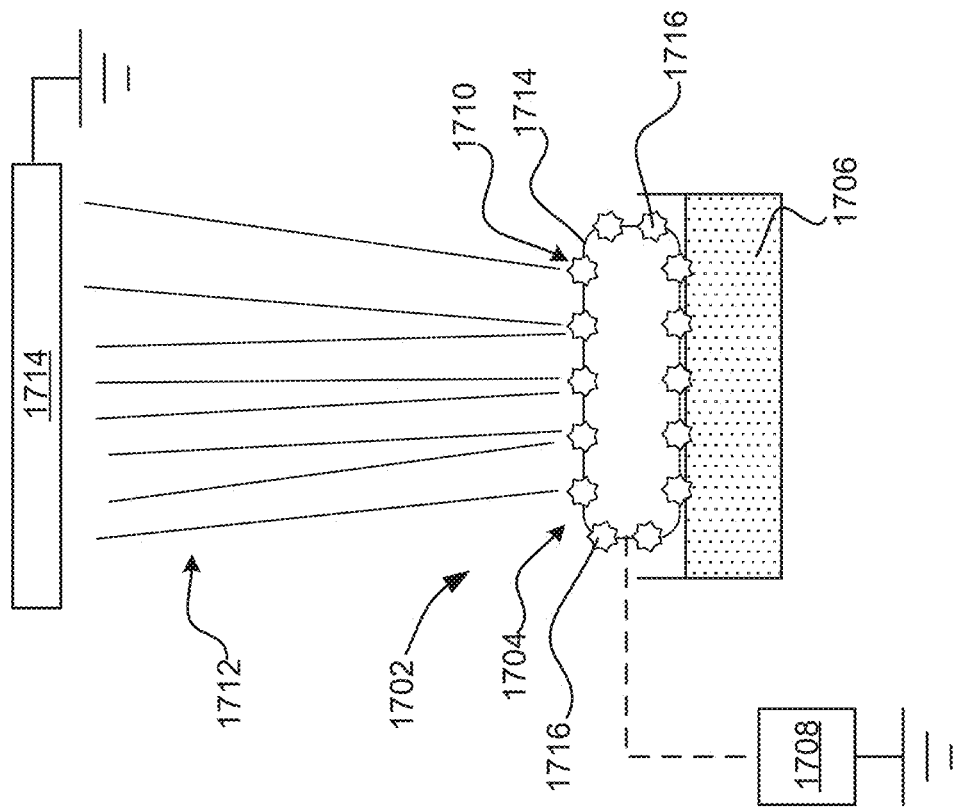
FIGS. 17C-17D further show cross-sectional, side views of needleless extrusion elements comprising a thread connecting a plurality of features each having a rough exterior surface (FIG. 17C) or a smooth exterior surface (FIG. 17D).
Figure 17C:
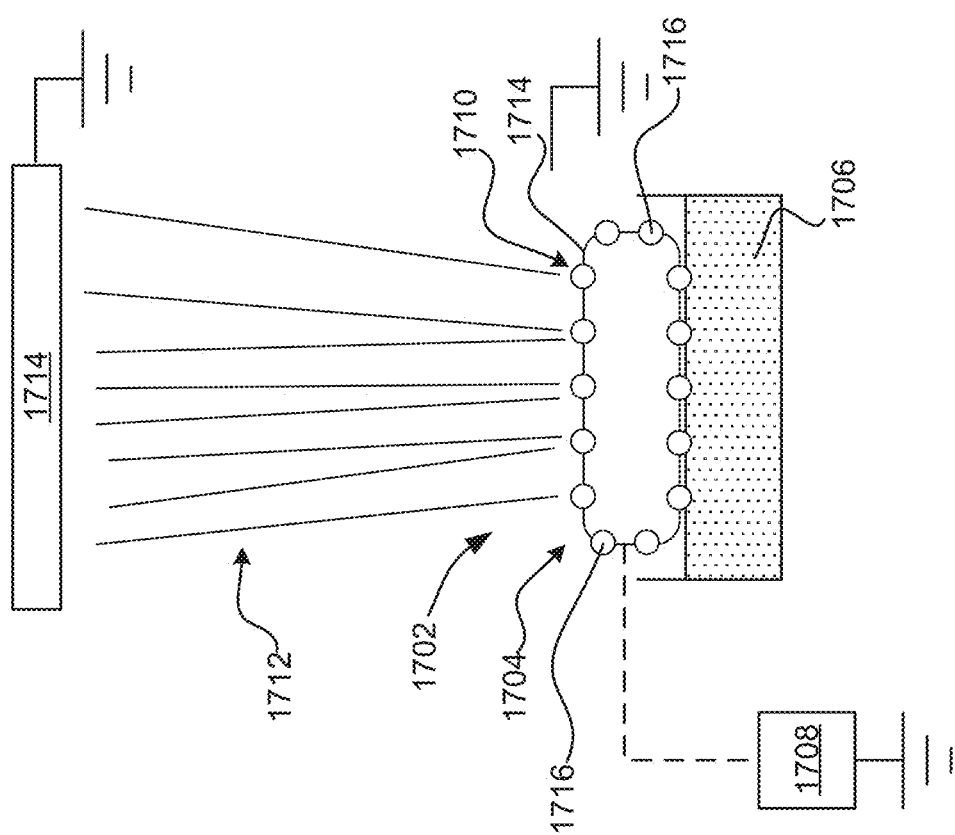

FIGS. 17C-17D provide additional embodiments of a needle-free spinneret 1702, in which the solution dipping component 1704 comprises a thread (or chain) 1714 connecting a plurality of dipping elements (particles) 1716. The thread 1714 may be configured to rotate so as to allow the dipping elements 1716 to be coated with the solution 1706. These dipping elements 416 may have a substantially rough exterior surface 1710, as shown in the embodiment of FIG. 17C, or a substantially smooth exterior surface 1710, as shown in the embodiment of FIG. 17D.

c. Systems for Producing a Multifunctional Nanofiber Web

Referring now to FIG. 18, a system 1800 for producing multifunctional nanofiber webs is shown, according to one embodiment. The system 1800, or components/features thereof, in FIG. 18 may be implemented in combination with, or as an alternative to, other systems, or components/features thereof, described herein, such as those described with reference to other embodiments and FIGS. The system 1800 may additionally be utilized in any of the methods for making and/or using nanofibers described herein. The system 1800 may also be used in various applications and/or in permutations, which may or may not be noted in the illustrative embodiments described herein. For instance, the system 1800 may include more or less features/components than those shown in FIG. 18, in some embodiments. Moreover, the system 1800 is also not limited to the size, shape, number of components/features, etc. specifically shown in FIG. 18.

As shown in FIG. 18, the system 1800 may include one or more polymer forming (e.g., electrospinning or electrospraying) stations 1802 (a, b, c, etc.). In some embodiments, at least one of the stations 1802 may be configured to produce a nanofiber web comprising the bicomponent or multicomponent nanofibers disclosed herein. For instance, at least one of the stations 1802 may include system 1400 as described in any one of FIGS. 14A-14J.

In addition to one or more stations 1802 configured to produce the nanofiber web comprising bicomponent or multicomponent nanofibers, as disclosed herein, the system 1800 may optionally comprise at least one station 1802 configured to extrude, e.g., via an electrospraying or electrospinning process, one or more additional materials (e.g., polymer material(s)) independently selected to provide a desired functional performance. Such functional performance may include, but is not limited to, light emission, heat insulation, heat resistance, sterilization, flame resistance, degradation, self-cleaning, anti-corrosion, adhesion, combinations thereof, etc. For instance, in one embodiment, the system may comprise at least one station (e.g., 1802a) configured to produce bicomponent or multicomponent nanofibers, as disclosed herein, and at least one station (e.g., 1802b) configured to extrude one or more additional materials independently selected to provide a desired functional performance.

In some embodiments, the system 1800 may optionally include one or more spray additive stations 1804 (a, b, etc.) and/or one or more roller additive stations 1806 (a, b, etc.) to provide a desired, functional end product.

In some embodiments, the substrate may be introduced prior to or after the process described in FIG. 18, or between any of the steps described therein.

3. Methods

Figure 19:
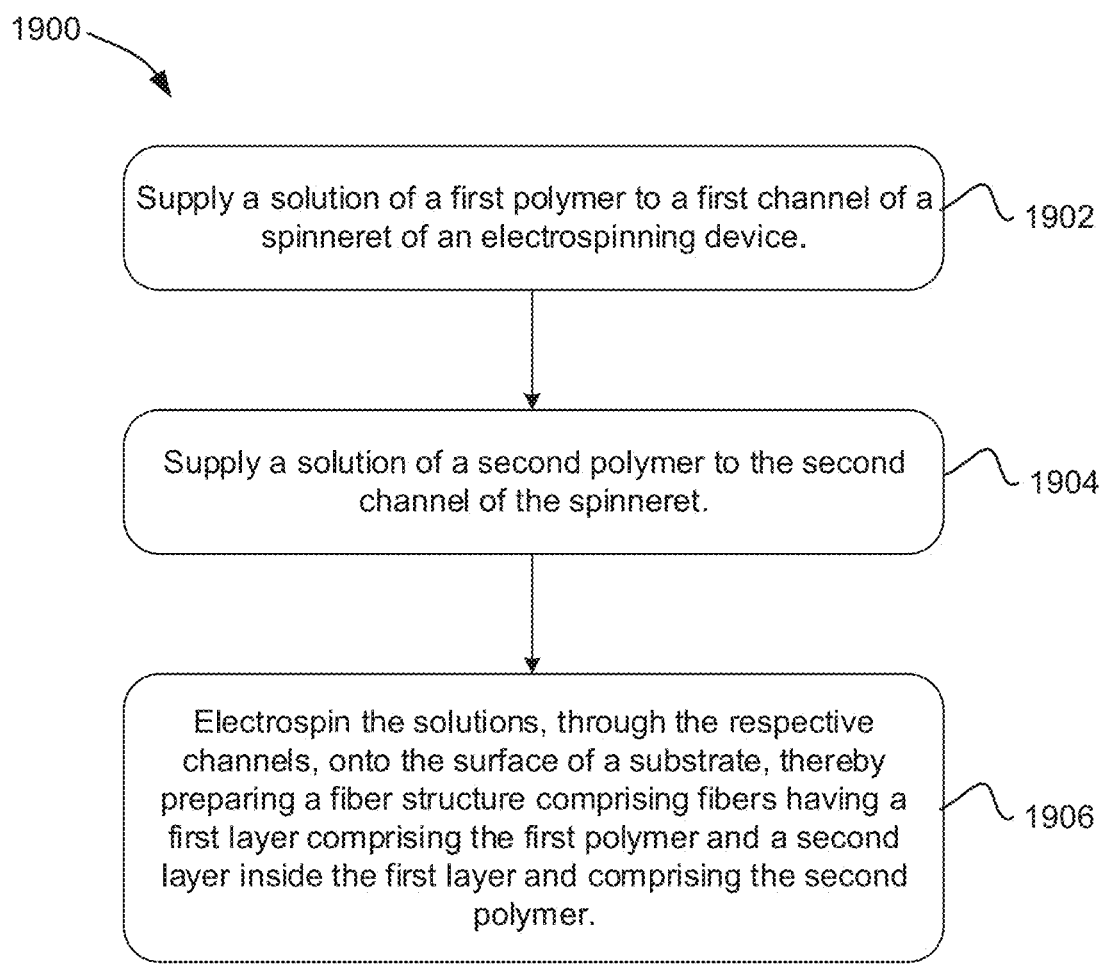
FIG. 19 is a flowchart of a method of preparing a bicomponent or multicomponent nanofiber, according to one embodiment.

Referring now to FIG. 19, a flowchart of a method 1900 of preparing a bicomponent or multicomponent nanofiber with an electrospinning device is shown according to one embodiment. The method 1900 may be implemented in conjunction with any of the features/components described herein, such as those described with reference to other embodiments and FIGS. The method 1900 may also be used for various applications and/or according to various permutations, which may or may not be noted in the illustrative embodiments/aspects described herein. For instance, the method 1900 may include more or less operations/steps than those shown in FIG. 19, in some embodiments. Moreover, the method 1900 is not limited by the order of operations/steps shown therein.

As shown in FIG. 19, the method 1900 comprises supplying a solution of a first polymer to a first channel of a spinneret of an electrospinning device, and supplying a solution of a second polymer to the second channel of the spinneret. See Steps 1902 and 1904, respectively. The method 1900 further comprises electrospinning the solutions, through the respective channels, onto the surface of a substrate, thereby preparing a fibrous structure comprising fibers having a first layer comprising the first polymer and a second layer inside the first layer and comprising the second polymer. See Step 1906.

In some embodiments of FIG. 19, one of the polymers may have a dipole moment greater than about 2 debye (D) and another polymer may have a dipole moment lower than about 1 D. In some embodiments, the first polymer may have a dipole moment greater than about 2 D and the second polymer may have a dipole moment lower than about 1 D.

In some embodiments, the first channel and the second channel of the electrospinning device may be coaxial (see, e.g. system 1400 of FIGS. 14A-14B configured to prepare bicomponent, coaxial nanofibers).

In some embodiments of FIG. 19, the spinneret may further comprise a third channel inside the second channel, and therefore the prepared fibers may comprise a first layer, a second layer inside the first layer, and a third layer inside the second layer (see e.g. system 1400 of FIGS. 14E-14F configured to prepare multicomponent, coaxial nanofibers). In such embodiments, the first layer may a dipole moment greater than about 2 D, the second polymer may have a dipole moment lower than about 1 D, and the third layer may have a dipole moment equal to or greater than about 1 D. In some embodiments, the first layer and the third layer comprise the same polymer. In some embodiments, the first layer and the third layer comprise different polymers.

In some embodiments of FIG. 19, the spinneret may comprise a plurality of non-overlapping second channels inside the first channel, and therefore the prepared fibers comprise a first layer and a plurality of non-overlapping second layers inside the first layer (see, e.g., system 1400 of FIGS. 14C-14D configured to prepare bicomponent, islands-in-sea nanofibers). In such embodiments, the first layer may a dipole moment greater than about 2 D, and at least one of the second layers may have a dipole moment lower than about 1 D. In some embodiments, the second layers may each comprise the same polymer having a dipole moment lower than about 1 D. In some embodiments, at least two of the second layers may comprise different polymers from one another provided that said polymers have a dipole moment lower than about 1 D.

In some embodiments of FIG. 19, the spinneret may comprise a plurality of non-overlapping second channels and a plurality of non-overlapping third channels inside the first channel, and therefore the prepared fibers comprise a first layer and a plurality of non-overlapping second layers and non-overlapping third layers inside the first layer (see, e.g., system 1400 of FIGS. 14G-14H configured to prepare a first type of multicomponent, islands-in-sea nanofibers). In such embodiments, the first layer may a dipole moment greater than about 2 D, the second layers may have a dipole moment lower than about 1 D, and the third layers may have a dipole moment equal to or greater than about 1 D.

In some embodiments of FIG. 19, the spinneret may comprise a plurality of non-overlapping second channels inside the first channel, and a third channel inside each of the plurality of second channels (see, e.g., system 1400 of FIGS. 14G-14H configured to prepare a second type of multicomponent, islands-in-sea nanofibers).

Figure 20:
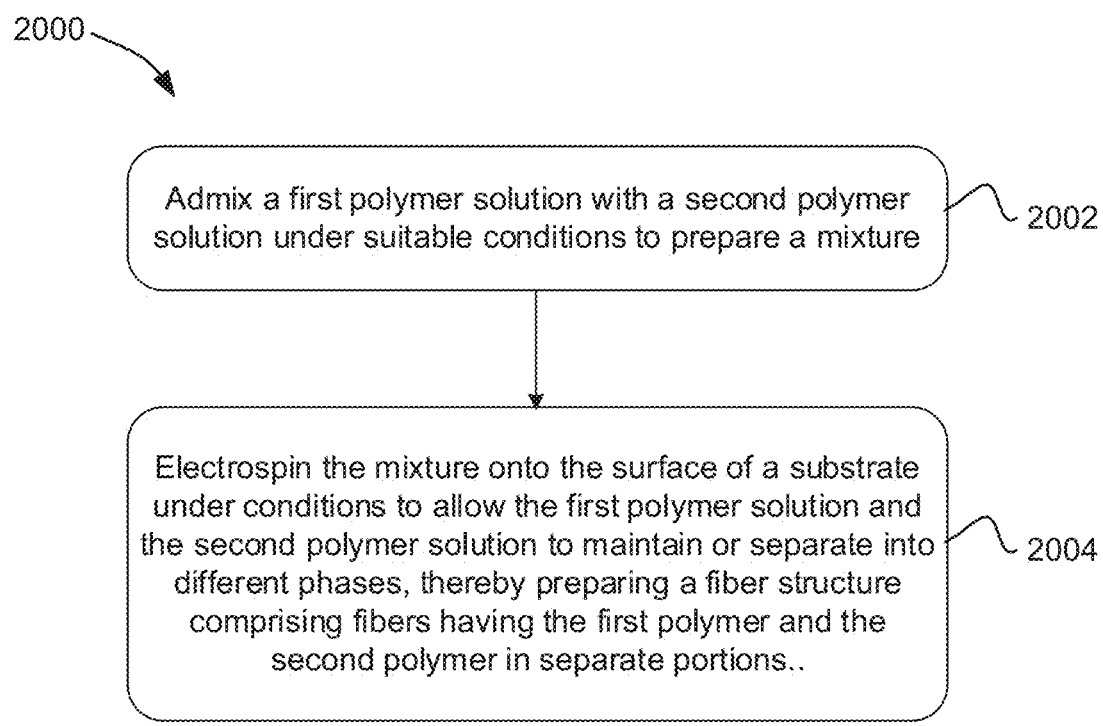
FIG. 20 is a flowchart of a method of preparing a bicomponent or multicomponent nanofiber, according to another embodiment.

Referring now to FIG. 20, a flowchart of a method 2000 of preparing a bicomponent or multicomponent nanofiber is shown according to another embodiment. The method 2000 may be implemented in conjunction with any of the features/components described herein, such as those described with reference to other embodiments and FIGS. The method 2000 may also be used for various applications and/or according to various permutations, which may or may not be noted in the illustrative embodiments/aspects described herein. For instance, the method 2000 may include more or less operations/steps than those shown in FIG. 20, in some embodiments. Moreover, the method 2000 is not limited by the order of operations/steps shown therein.

As shown in FIG. 20, the method 2000 comprises admixing a first polymer solution with a second polymer solution under suitable conditions to prepare a mixture. See Step 2002. In some embodiments, the mixture may comprise about equal volumes of the first polymer solution and the second polymer solution. In some embodiments, the ratio of the first polymer solution to the second polymer solution in the mixture is about 1:100 to about 100:1. In some embodiments, the ratio of the first polymer solution to the second polymer solution in the mixture is about 100:1 to about 1:1, about 75:1 to about 1:1, about 50:1 to about 1:1, about 25:1 to about 1:1, about 10:1 to about 1:1, about 5:1 to about 1:1, or about 1:1. In some embodiments, the ratio of the first polymer solution to the second polymer solution in the mixture is about 1:100 to about 1:1, about 1:75 to about 1:1, about 1:50 to about 1:1, about 1:25 to about 1:1, about 1:10 to about 1:1, about 1:5 to about 1:1, or about 1:1. In some embodiments, the ratio of the first polymer solution to the second polymer solution in the mixture is about 1:1.

In some embodiments of FIG. 20, at least a portion of the mixture is homogeneous. In some embodiments, substantially all of the mixture is homogeneous. For instance, in some embodiments, the first polymer solution may be substantially evenly dispersed in the second polymer solution. In some embodiments, the second polymer solution may be substantially evenly dispersed in the first polymer solution. As discussed below, phase separation of the mixture may occur during the subsequent electrospinning process.

In some embodiments of FIG. 20, at least a portion of the mixture is non-homogeneous. In some embodiments, substantially all of the mixture is non-homogeneous. As discussed below, phase separation of the mixture may be maintained and/or further increased during the subsequent electrospinning process As also shown in FIG. 20, the method 2000 additionally comprises electrospinning the mixture onto the surface of a substrate under conditions to allow the first polymer solution and the second polymer solution to maintain or separate into different phases, thereby preparing a fibrous structure comprising fibers having the first polymer and the second polymer in separate portions. See Step 2004.

In some embodiments, the first polymer and the second polymer have different dipole moments In some embodiments of FIG. 20, the first polymer has a dipole moment greater than about 2 D and the second polymer has a dipole moment lower than about 1 D.

In some embodiments of FIG. 20, the first polymer solution comprises a first therapeutic molecule. In some embodiments, the second polymer solution comprises a second therapeutic molecule. In some embodiments, the first therapeutic molecule requires a shorter release time in human patients than the second therapeutic molecule. In some embodiments, the second therapeutic molecule requires a shorter release time in human patients than the first therapeutic molecule.

Figure 21:
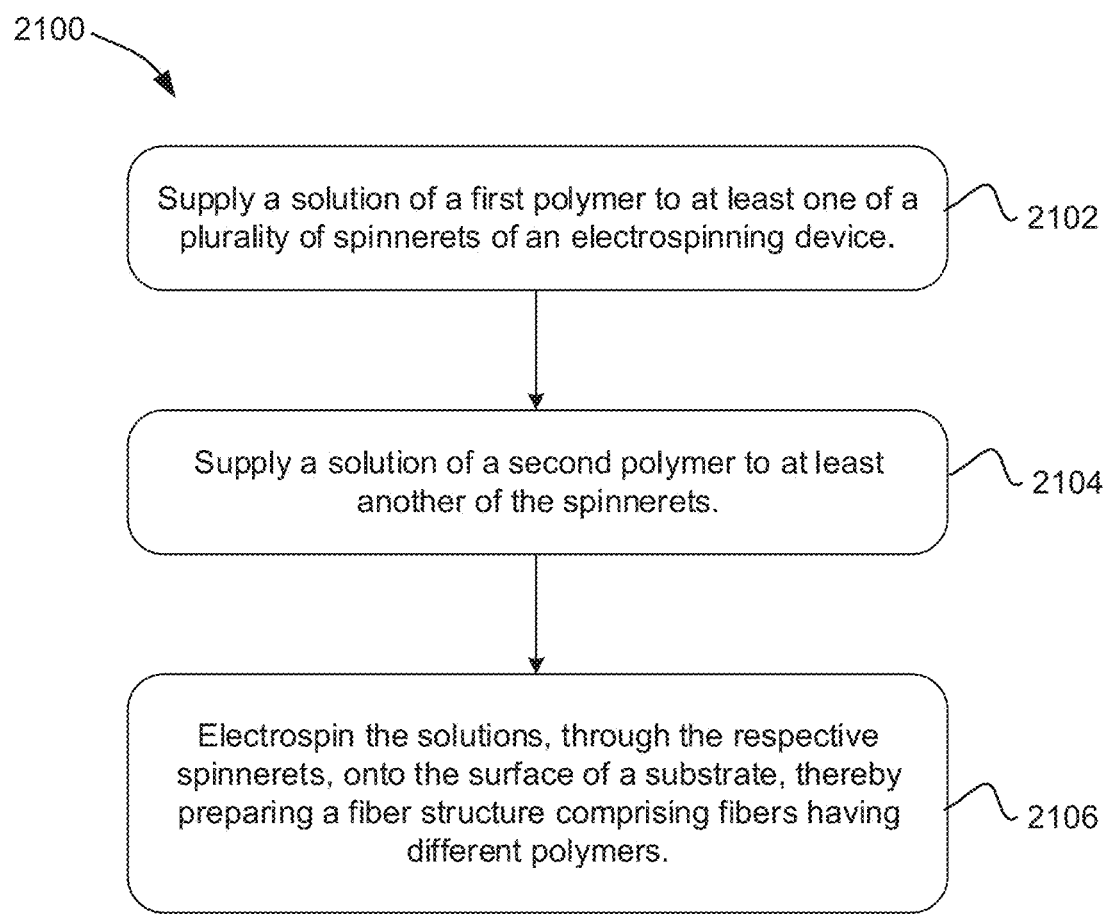
FIG. 21 is a flowchart of a method of preparing a fibrous structure with an electrospinning device comprising a plurality of spinnerets, according to one embodiment.

Referring now to FIG. 21, a flowchart of a method 2100 of preparing a fibrous structure with an electrospinning device comprising a plurality of spinnerets is shown according to one embodiment. The method 2100 may be implemented in conjunction with any of the features/components described herein, such as those described with reference to other embodiments and FIGS. The method 2100 may also be used for various applications and/or according to various permutations, which may or may not be noted in the illustrative embodiments/aspects described herein. For instance, the method 2100 may include more or less operations/steps than those shown in FIG. 21, in some embodiments. Moreover, the method 2100 is not limited by the order of operations/steps shown therein.

As shown in FIG. 21, the method 2100 comprises supplying a solution of a first polymer to at least one of the spinnerets, and supplying a solution of a second polymer to at least another of the spinnerets. See Steps 2102 and 2104, respectively. The method 2100 additionally comprises electrospinning the solutions, through the respective spinnerets, onto the surface of a substrate, thereby preparing a fibrous structure comprising fibers having different polymers. See step 2106.

In some embodiments, the electrospinning device may comprise at least a row of spinnerets and at least one of the spinnerets in the row is connected to the first solution and at least another of the spinnerets in the row is connected to the second solution (see, e.g., the spinneret configurations shown in FIGS. 16B-16C). In some embodiments, the electrospinning device comprise a plurality of rows of spinnerets and all spinnerets in at least one row are connected to the first solution and all spinnerets in at least another row are connected to the second solution.

In some embodiments of FIG. 21, the first polymer and the second polymer have different dipole moments. In some embodiments, one of the polymers has a dipole moment greater than about 2 D and another polymer has a dipole moment lower than about 1 D.

Figure 22:
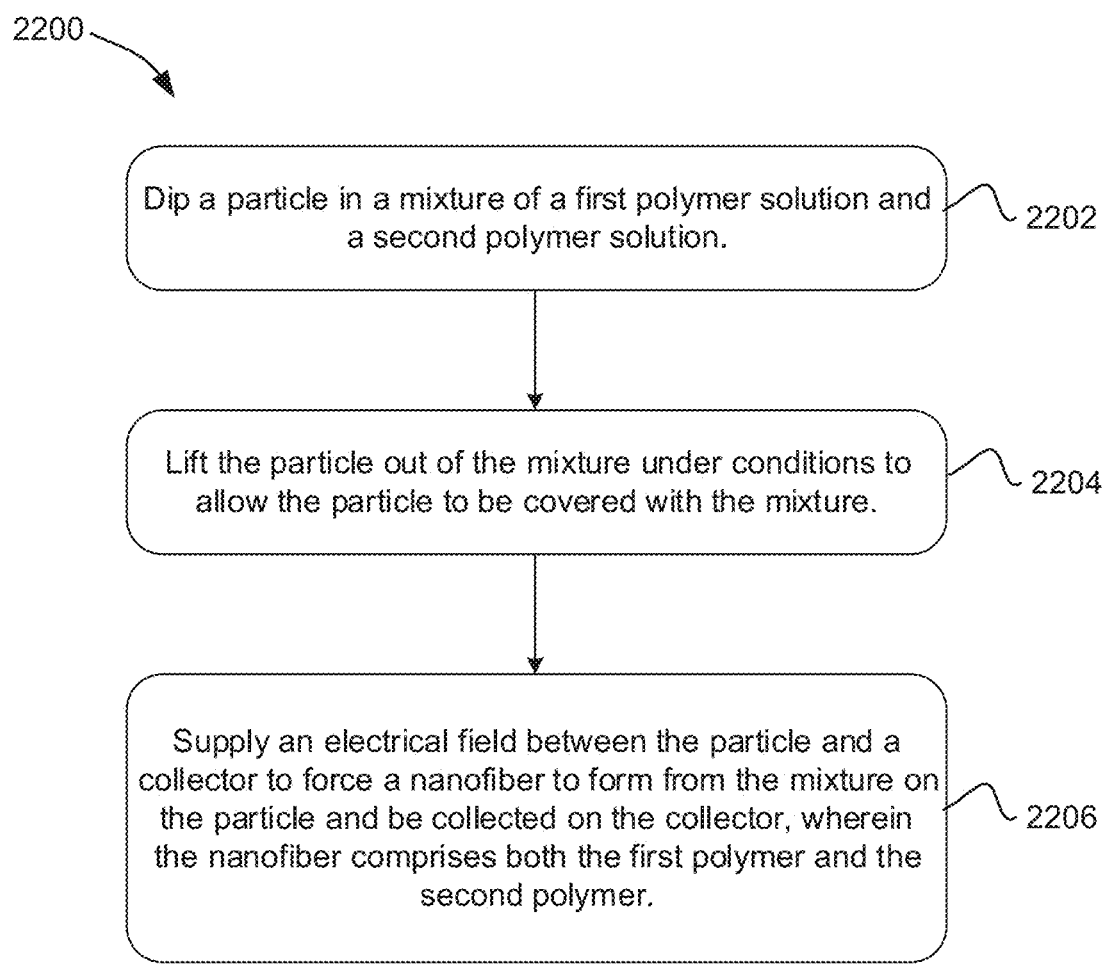
FIG. 22 is a flowchart of a method of preparing a bicomponent or multicomponent nanofiber, according to yet another embodiment.

Referring now to FIG. 22, a flowchart of a method 2200 of preparing a bicomponent or multicomponent nanofiber is shown according to one embodiment. The method 2200 may be implemented in conjunction with any of the features/components described herein, such as those described with reference to other embodiments and FIGS. The method 2200 may also be used for various applications and/or according to various permutations, which may or may not be noted in the illustrative embodiments/aspects described herein. For instance, the method 2200 may include more or less operations/steps than those shown in FIG. 22, in some embodiments. Moreover, the method 2200 is not limited by the order of operations/steps shown therein.

As shown in FIG. 22, the method comprises dipping a particle in a mixture of a first polymer solution and a second polymer solution, and lifting the particle out of the mixture under conditions to allow the particle to be covered with the mixture. See Steps 2202 and 2204, respectively. The method 2200 further comprises applying an electrical field between the particle and a collector to force a nanofiber to form from the mixture on the particle and be collected on the collector, wherein the nanofiber comprises both the first polymer and the second polymer. See Step 2206.

In some embodiments of FIG. 22, at least part of the first solution has phase separation from the second solution. In some embodiments, at least part of the first polymer solution is substantially located at the surface of the mixture.

In some embodiments of FIG. 22, the particle may have an exterior rough surface (see, e.g., the needleless system described in FIG. 17A). In some embodiments, the particle may have a smooth exterior surface (see, e.g., the needleless system described in FIG. 17A).

In some embodiments of FIG. 22, the particle may be connected to one or more particles through a thread (see, e.g., the needleless system described in FIG. 17C-17D).

Figure 23:
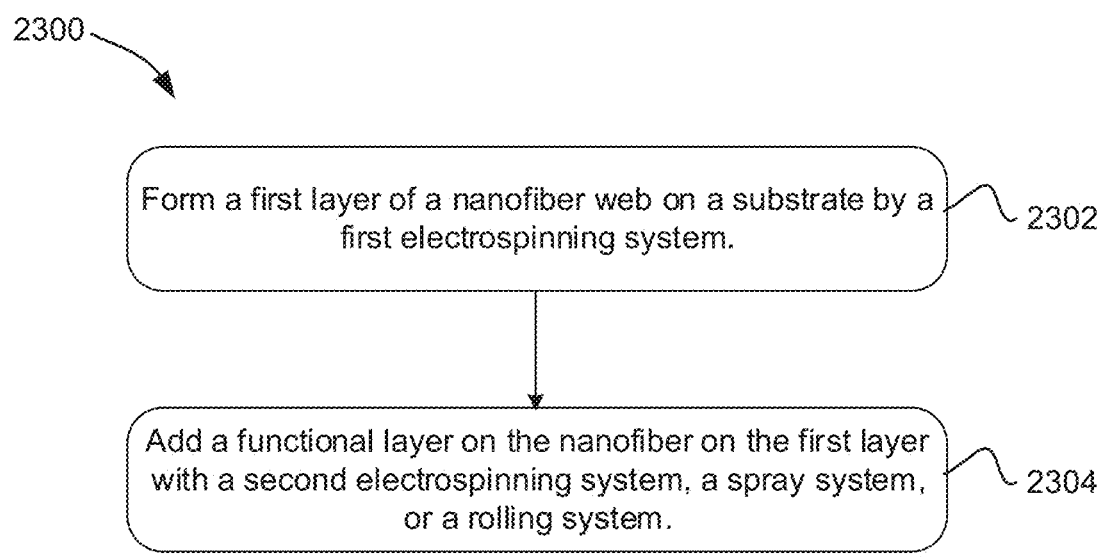
FIG. 23 is flowchart of a method of preparing a multifunctional web, according to one embodiment.

Referring now to FIG. 23, a flowchart of a method 2300 of preparing a multifunctional web is shown according to one embodiment. The method 2300 may be implemented in conjunction with any of the features/components described herein, such as those described with reference to other embodiments and FIGS. The method 2300 may also be used for various applications and/or according to various permutations, which may or may not be noted in the illustrative embodiments/aspects described herein. For instance, the method 2300 may include more or less operations/steps than those shown in FIG. 23, in some embodiments. Moreover, the method 2300 is not limited by the order of operations/steps shown therein.

As shown in FIG. 23, the method 2300 comprises forming a first layer of a nanofiber web on a substrate by a first electrospinning system, and adding a functional layer on the nanofiber on the first layer with a second electrospinning system, a spray system, or a rolling system. See Steps 2302 and 2304, respectively. In some embodiments the first layer and the second layer comprise different polymers or have different dipole moments.

In some embodiments of FIG. 23, one of the polymers has a dipole moment greater than about 2 D and another of the polymers has a dipole moment lower than about 1 D.

In some embodiments of FIG. 23, the method 2300 further comprises adding one or more additives by electrospinning, electrospraying or roller electrospinning.

In some embodiments, the resulting multicomponent nanofiber web is configured to be useful for light emission, heat insulation, heat resistance, sterilization, flame resistance, degradation, self-cleaning, anti-corrosion, or combinations thereof.

Unless otherwise defined, all technical and scientific terms used herein have the same meaning as commonly understood by one of ordinary skill in the art to which this invention belongs.

Throughout the present specification and claims, unless the context requires otherwise, the word "comprise" and variations thereof (e.g., "comprises" and "comprising") are to be construed in an open, inclusive sense, that is as "including, but not limited to." Additionally, the singular forms "a," "an" and "the" include plural referents unless the context clearly dictates otherwise.

Recitation of numeric ranges of values throughout the specification is intended to serve as a shorthand notation of referring individually to each separate value falling within the range inclusive of the values defining the range, and each separate value is incorporated in the specification as it were individually recited herein.

Reference to "about" a value or parameter herein includes (and describes) embodiments that are directed to that value or parameter per se. In some embodiments, the term "about" includes the indicated amount ±10%.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

The invention described and claimed herein is not to be limited in scope by the specific embodiments disclosed herein, as these embodiments are intended as illustrations of several aspects of the invention. Indeed, various modifications of the invention in addition to those shown and described herein will become apparent to those skilled in the art from the foregoing description. Such modifications include the substitution of known equivalents for any aspect of the invention in order to achieve the same result in substantially the same way. Such modifications are also intended to fall within the scope of the appended claims.

What is claimed is:

1. A method of preparing a bicomponent or multicomponent nanofiber, the method comprising:
    admixing a first polymer solution with a second polymer solution under suitable conditions to prepare a mixture, wherein the first polymer solution and the second polymer solution in the mixture are phase separated into different phases; and
    electrospinning the mixture onto the surface of a substrate under conditions to allow the first polymer solution and the second polymer solution to maintain or separate into the different phases during the electrospinning, thereby preparing a fibrous structure comprising fibers having the first polymer and the second polymer in separate portions,
    wherein the first polymer and the second polymer have different dipole moments.

2. The method of claim 1, wherein mixture comprises about equal volumes of the first polymer solution and the second polymer solution.

3. The method of claim 1, wherein, in the mixture, the ratio of the first polymer solution to the second polymer solution is about 1:100 to about 100:1, about 1:10 to about 10:1, or about 1:1.

4. The method of claim 1, wherein at least part of the first polymer solution is phase separated from the second polymer solution.

5. A method of preparing a bicomponent or multicomponent nanofiber, the method comprising:
    dipping a particle in a mixture of a first polymer solution and a second polymer solution wherein at least part of the first polymer solution is phase separated from the second polymer solution and is substantially located at a surface of the mixture;
    lifting the particle out of the mixture under conditions to allow the particle to be covered with the mixture while the at least part of the first polymer solution is maintained as phase separated from the second polymer solution and is substantially located at the surface of the mixture; and
    applying an electrical field between the particle and a collector to force a nanofiber to form from the mixture on the particle and be collected on the collector, wherein the nanofiber comprises both the first polymer and the second polymer.

6. The method of claim 5, wherein the particle has a rough exterior surface.

7. The method of claim 5, wherein the particle has a smooth exterior surface.

8. The method of claim 5, wherein the particle is connected to one or more particles through a thread.

* * * * *